United States Patent [19]
Abe et al.

[11] Patent Number: 5,989,510
[45] Date of Patent: *Nov. 23, 1999

[54] METHOD OF PRODUCING GRANULAR AMORPHOUS SILICA

[75] Inventors: Kiyoshi Abe; Kazuhiko Suzuki; Hiroshi Ogawa, all of Tokyo, Japan

[73] Assignee: Mizusawa Industrial Chemical, Ltd., Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/670,240

[22] Filed: Jun. 17, 1996

Related U.S. Application Data

[63] Continuation of application No. 08/363,835, Dec. 27, 1994, abandoned.

[30] Foreign Application Priority Data

Dec. 28, 1993 [JP] Japan ................................ 5-349036
Sep. 30, 1994 [JP] Japan ................................ 6-261153

[51] Int. Cl.$^6$ .................................................. C01B 33/12
[52] U.S. Cl. ............................................................ 423/339
[58] Field of Search ...................................... 423/335, 339

[56] References Cited

U.S. PATENT DOCUMENTS 4,128,630 12/1978 Hayashi et al. ............................ 424/69
5,342,876 8/1994 Abe et al. ................................ 423/335

*Primary Examiner*—Steven Bos
*Assistant Examiner*—Stuart L. Hendrickson
*Attorney, Agent, or Firm*—Sherman and Shalloway

[57] ABSTRACT

A method of directly precipitating a spherical amorphous silica in a high yield by adding a carboxymethyl cellulose (CMC) as a coagulation growing agent in a step of neutralizing the alkali silicate with an acid. The CMC having a particular etherification degree and a particular polymerization degree is added in an amount of from 1 to 100% by weight reckoned as $SiO_2$ with respect to silica in the alkali silicate, whereby the whole silica particles turn into spherical amorphous silica particles having high sphericalness. There can be obtained spherical amorphous silica particles having a BET specific surface area of from 25 to 800 $m^2/g$, an apparent specific gravity of from 0.1 to 0.8 and a particle diameter of from 0.2 to 50 $\mu$m cheaply and in a high yield.

3 Claims, 17 Drawing Sheets

F I G. 18
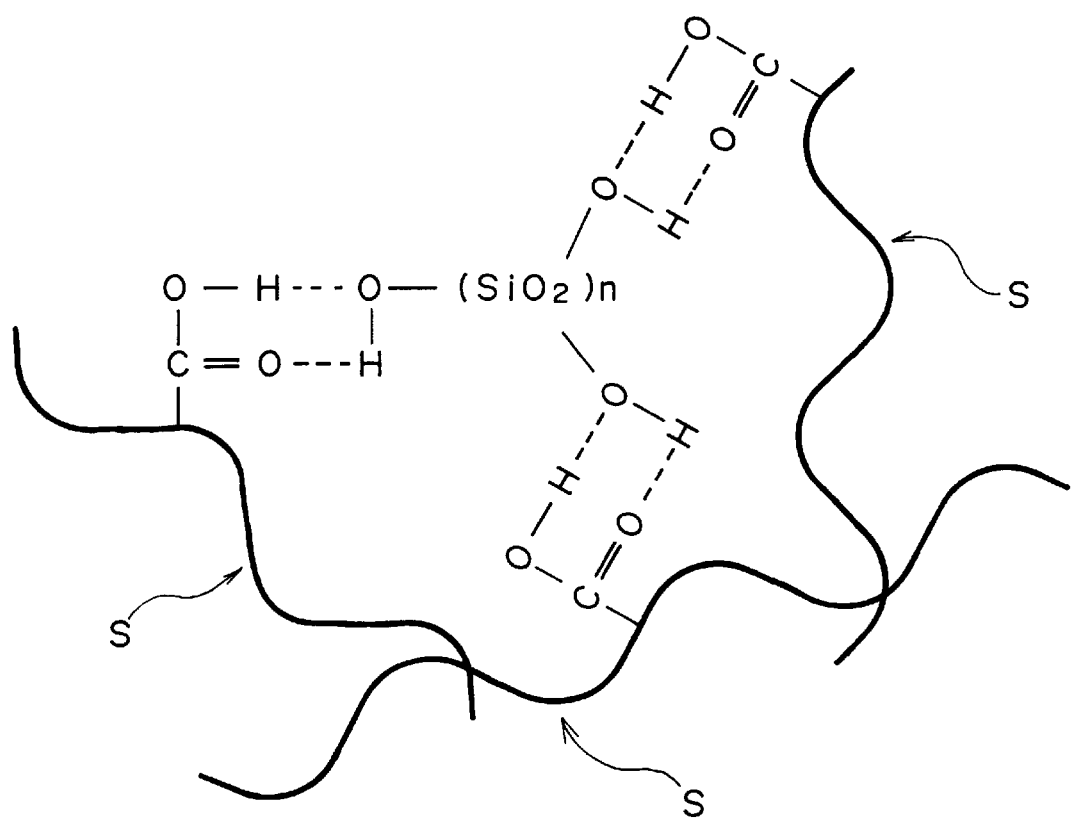

METHOD OF PRODUCING GRANULAR AMORPHOUS SILICA

This application is a continuation of application Ser. No. 08/363,835, filed Dec. 27, 1994 now abandoned.

BACKGROUND OF THE INVENTION

1. Field of the Invention

The present invention relates to a method of producing a granular amorphous silica and, more specifically, to a method of directly producing a spherical amorphous silica in a step of neutralizing a mixture solution of an alkali silicate and a carboxymethyl cellulose (CMC) with an acid.

2. Prior Art

Owing to their properties, amorphous silica particles have been extensively used as a filler for paints, information-recording papers, rubbers and resin-molded articles and as a carrier for catalysts, chromatos, perfumes, medicinal components and the like. They can be produced by a dry method or a wet method. The dry-method silica particles have a fine spherical shape as they are obtained by decomposing $SiCl_4$ in an oxygen-hydrogen flame and have relatively small surface activity due to their specific surface area, porous volume and porous distribution. The wet-method silica particles have relatively large surface activity and are indefinite in shape as they are obtained by neutralizing an alkali silicate with an acid. In particular, the latter wet method makes it possible to obtain an amorphous silica having widely different properties by changing the conditions such as the concentration of the reaction product, temperature, pressure, time and reaction method at the time of neutralizing the alkali silicate with an acid.

In utilizing the amorphous silica particles for a variety of applications, one of the important characteristics is the dispersion property of the silica particles. To obtain this property, the particles must have a predetermined spherical shape with small coagulating property.

So far, fine spherical silica particles have been produced by hydrolyzing an organosilane in an organic solvent such as ethanol, by forming a silica sol or gel into spheres, by preparing a W/O emulsion from an aqueous solution of alkali silicate and an organic solvent followed by hydrolysis, by adding an organic gelating agent such as formamide to a mixture of a colloidal silica and an alkali silicate by forming fused silica into spherical particles, and by treating a definite shape particles of various kinds of zeolites with an acid. According to the above conventional methods, however, the starting materials that are used are expensive, and the aforementioned demands are not satisfied to a sufficient degree.

In recent years, U.S. Pat. No. 4,752,458 is disclosing a method of producing fine spherical silica comprising adding an acid solution to a solution of a soluble silicic acid, and then adding thereto a metal salt of alkali alginate, ammonium alginate, starch, gelatine, pectin, or an organic polymer solution of a mixture thereof prior to forming a gel.

The present inventors have proposed in Japanese Laid-Open Patent Publication No. 193927/1993 a method of producing amorphous spherical silica particles by adding an acrylamide-type water-soluble high molecular polymer in a step of neutralizing an alkali silicate with an acid.

The above prior arts are excellent in their idea for directly producing fine spherical silica particles by adding a water-soluble high molecular polymer in a step of neutralizing the alkali silicate with an acid, but leave problems that must be solved in practicability.

First, according to the former method, the yield of the fine spherical particles is about 40%, the obtained particles have uneven shapes and particle sizes, and are very poorly filtered exhibiting very poor practicability (see Comparative Examples appearing later).

According to the latter method, on the other hand, the yield of fine spherical particles is greatly improved, the obtained particles exhibit uniform shapes and particle diameters and are further excellently filtered accompanied, however, by a problem in that a coagulation growing agent which is used is a relatively expensive water-soluble high molecular polymer of the type of acrylamide and must be used in large amounts still leaving room for improvement from the standpoint of cost.

SUMMARY OF THE INVENTION

The present inventors have conducted keen study and have discovered the fact that uniform, fine and spherical silica particles can be obtained from a partly neutralized product of an alkali silicate in a good yield, exhibiting good filtering property and under good precipitating conditions if a carboxymethyl cellulose (CMC) is made present in a step of neutralizing an alkali silicate solution with an acid.

That is, the object of the present invention is to provide a method of producing a spherical and amorphous silica by precipitating fine spherical silica in a good yield in a step of neutralizing the alkali silicate with an acid.

Another object of the present invention is to provide a method of producing a granular amorphous silica having a spherical shape or a definite shape close to the spherical shape maintaining uniform particle size distribution highly efficiently and cheaply.

According to the present invention, there is provided a method of producing a granular amorphous silica comprising mixing an aqueous solution of an alkali silicate, a carboxymethyl cellulose (CMC) having an etherification degree of from 0.5 to 2.5 and, particularly, from 0.8 to 2.0 and a partly neutralizing amount of acid aqueous solution, leaving the obtained mixture solution to stand so that a granular product is formed from a partly neutralized product of the alkali silicate, and neutralizing the granular product with an acid.

It is desired that the polymerization degree of the carboxymethyl cellulose (CMC) that is used is from 10 to 3000 and, particularly, from 200 to 1000, and that the carboxymethyl cellulose (CMC) is added in an amount of from 1 to 100% by weight and, particularly, from 5 to 50% by weight per silica ($SiO_2$) in the aqueous solution of the alkali silicate.

It is desired that the aqueous solution of the alkali silicate is made present in the mixture solution at a concentration of from 3 to 10% by weight as $SiO_2$ and that the acid is added during the partial neutralization such that the pH of the mixture solution is from 10.2 to 11.2.

According to the present invention, a coagulation growth assisting agent consisting of a water-soluble inorganic electrolyte or other water-soluble high molecular polymer is used together with CMC so as to be present therein prior to effecting the partial neutralization. This means is particularly effective when CMC is used in small amounts or when the etherification degree of CMC used is low. It is desired that the coagulation growth assisting agent such as the water-soluble inorganic electrolyte or the like is made present in an amount of from 0.5 to 100% by weight and, particularly, from 3 to 50% by weight per silica ($SiO_2$) in the aqueous solution of the alkali silicate.

According to the present invention, furthermore, though generally not needed, a dispersion of a fine amorphous silica particle can be added in such an amount that does not cause the mixture solution to become turbid while prior to effecting the partial neutralization. The dispersion can be used in an amount of up to 100% by weight and, particularly, in an amount of not greater than 50% by weight per silica ($SiO_2$) in the aqueous solution of the alkali silicate.

The granular amorphous silica obtained according to the present invention usually has a BET specific surface area of from 25 to 800 $m^2/g$, a primary particle size of from 0.2 to 50 $\mu m$ as observed using a scanning-type electron microscope, a high sphericalness as a whole, and an apparent specific gravity (JIS K-6220) of from 0.1 to 0.8.

According to another aspect of the present invention, there is provided a method of producing a reformed granular amorphous silica by treating the granular amorphous silica obtained by the above-mentioned method with a hydroxide of an alkaline earth metal or zinc, an oxide thereof or a salts thereof.

BRIEF DESCRIPTION OF THE DRAWINGS

FIG. 18 is a diagram which schematically illustrates the bonding between a spherical silica particle and a carboxymethyl cellulose (CMC).

DETAILED DESCRIPTION OF THE INVENTION

The present invention is based on a discovery that a partly neutralized product of an alkali silicate grows into spherical particles of a definite shape in a good yield if a carboxymethyl cellulose having an etherification degree that lies within a predetermined range is made present in partly neutralizing the alkali silicate.

The carboxymethyl cellulose (CMC) is a cellulose ether in which a carboxymethyl group is introduced into a hydroxyl group of cellulose, and is often called cellulose glycolate. It is theoretically possible to prepare CMC having an etherification degree of 3 in which three hydroxyl groups are all etherified per a cellulose unit. Most of the CMCs placed in the market have etherification degrees of from about 0.5 to about 1.0. In recent years, however, those having etherification degrees of not smaller than 1.0 have been widely placed in the market. In many cases, CMC stands for a sodium carboxymethyl cellulose (Na-CMC) which is a sodium salt that can be advantageously used for accomplishing the object of the present invention. The value of etherification degree of CMC is found in compliance with the ash alkali method stipulated by the association of CMC industries.

According to the present invention, spherical amorphous silica particles are stably obtained by using, as a coagulation growing agent, a carboxymethyl cellulose having an etherification degree of not smaller than 0.5, particularly, not smaller than 0.8 and, most preferably, larger than 1.

Reference should be made to FIGS. 1 to 6 which are scanning-type electron microphotographs illustrating granular structures of amorphous silica particles obtained by changing the etherification degree of CMC that is used as a coagulation growing agent in the present invention.

Figure 1:
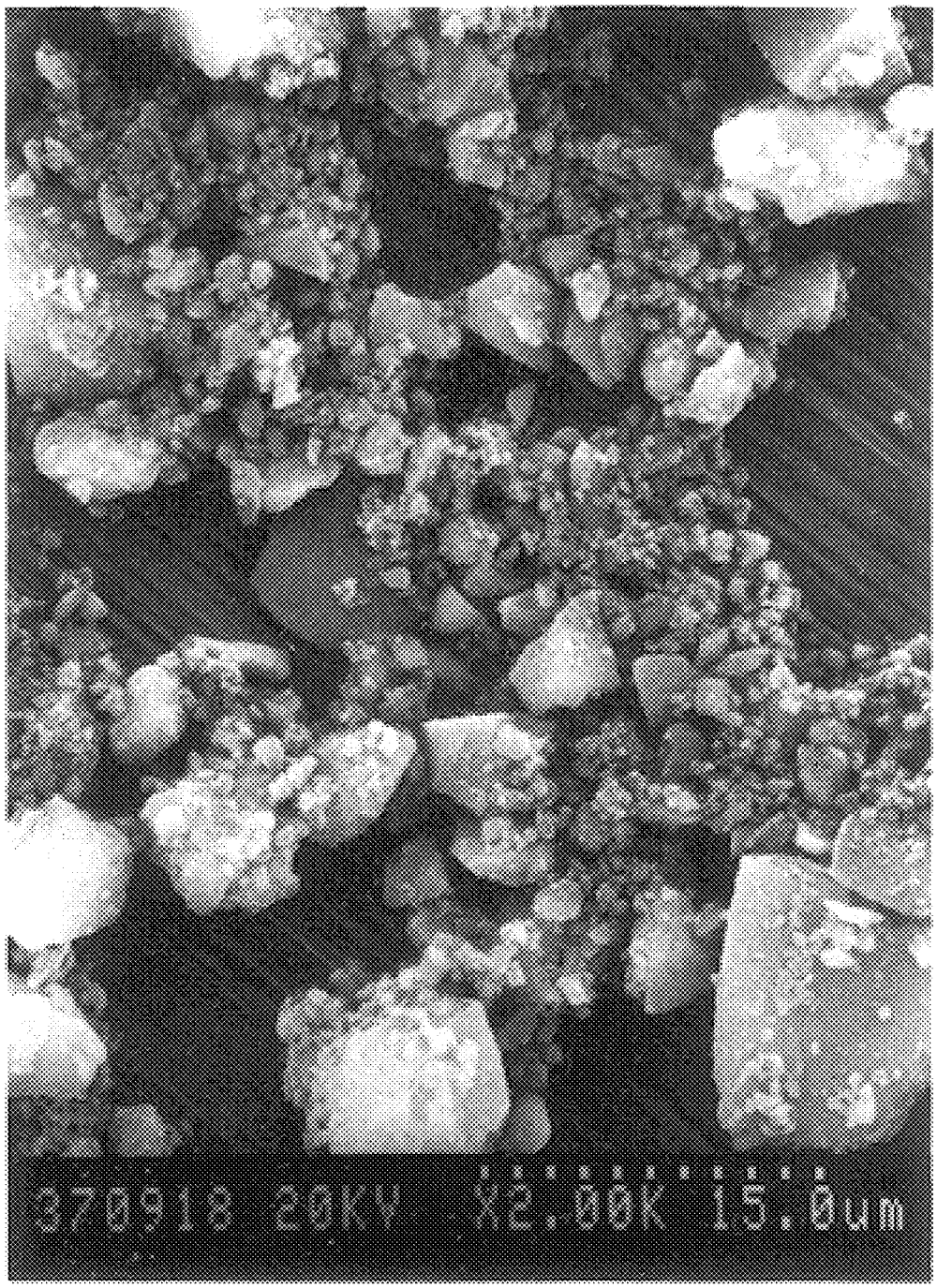
FIG. 1 is an electron microphotograph (magnification of 2000 times) illustrating the granular structure of amorphous silica obtained in Comparative Example 1.
Figure 2:
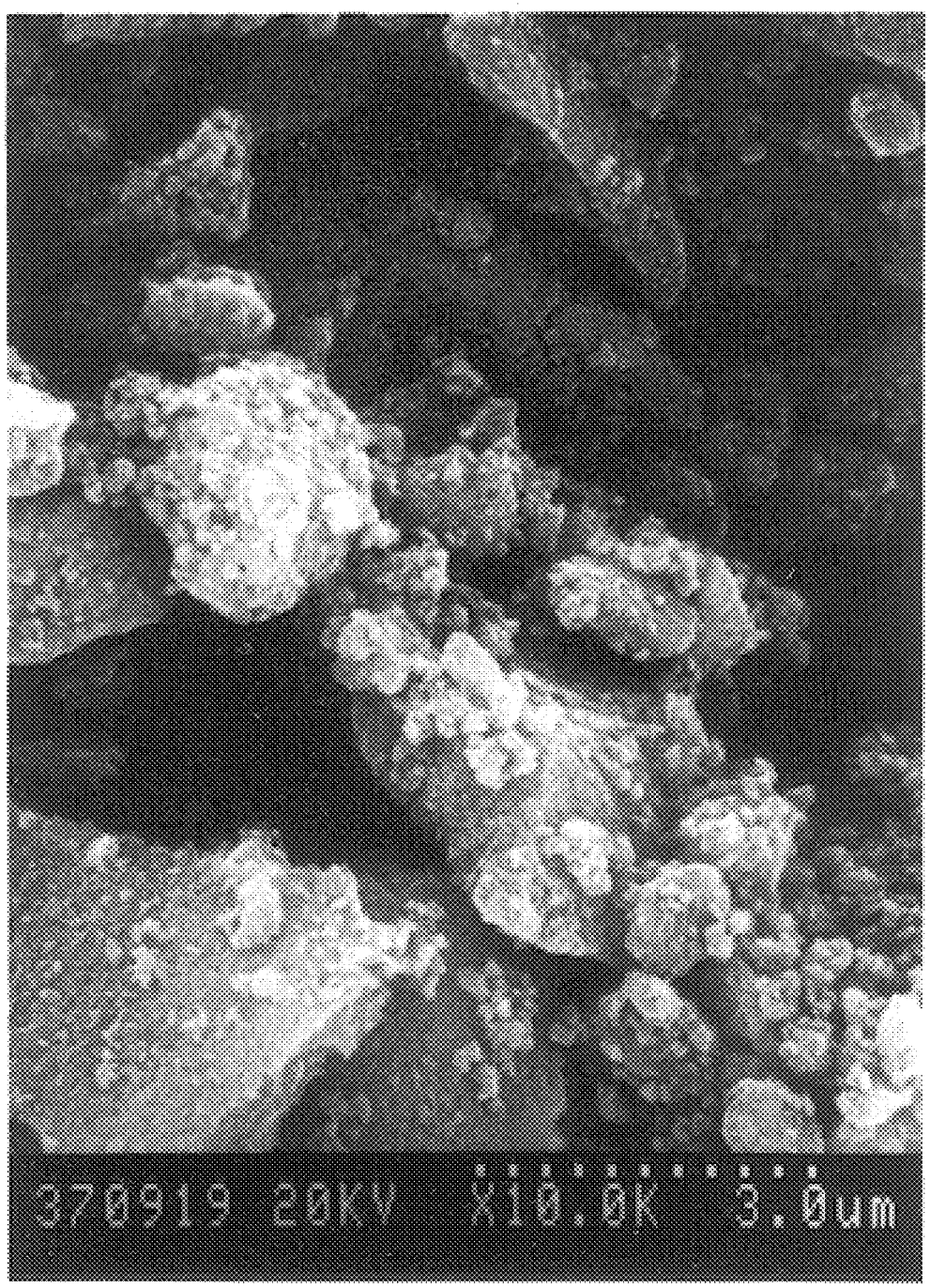
FIG. 2 is an electron microphotograph (magnification of 10000 times) illustrating the granular structure of amorphous silica obtained in Comparative Example 1.
Figure 3:
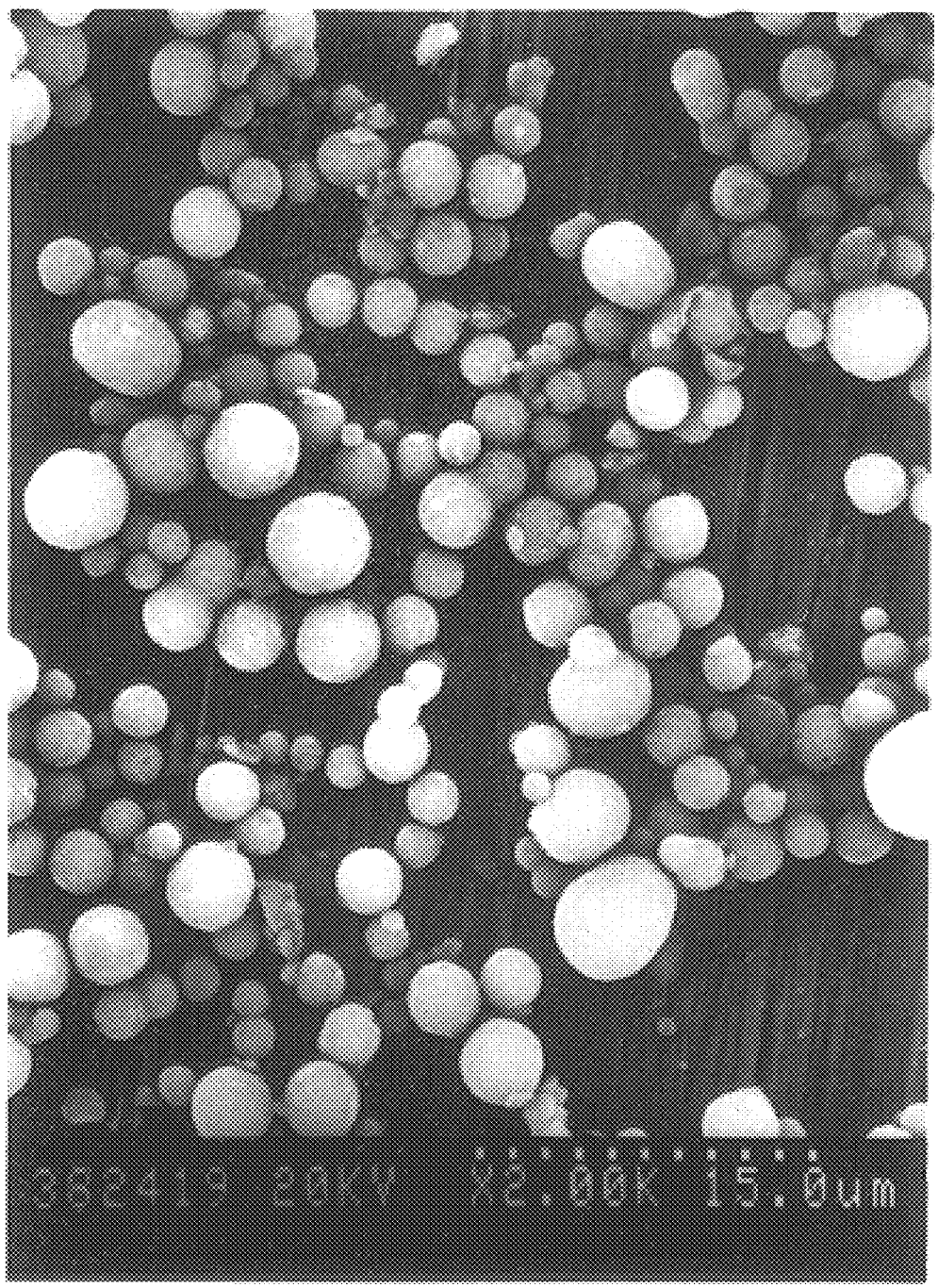
FIG. 3 is an electron microphotograph (magnification of 2000 times) illustrating the granular structure of spherical amorphous silica particles obtained in Example 1 of the present invention.
Figure 4:
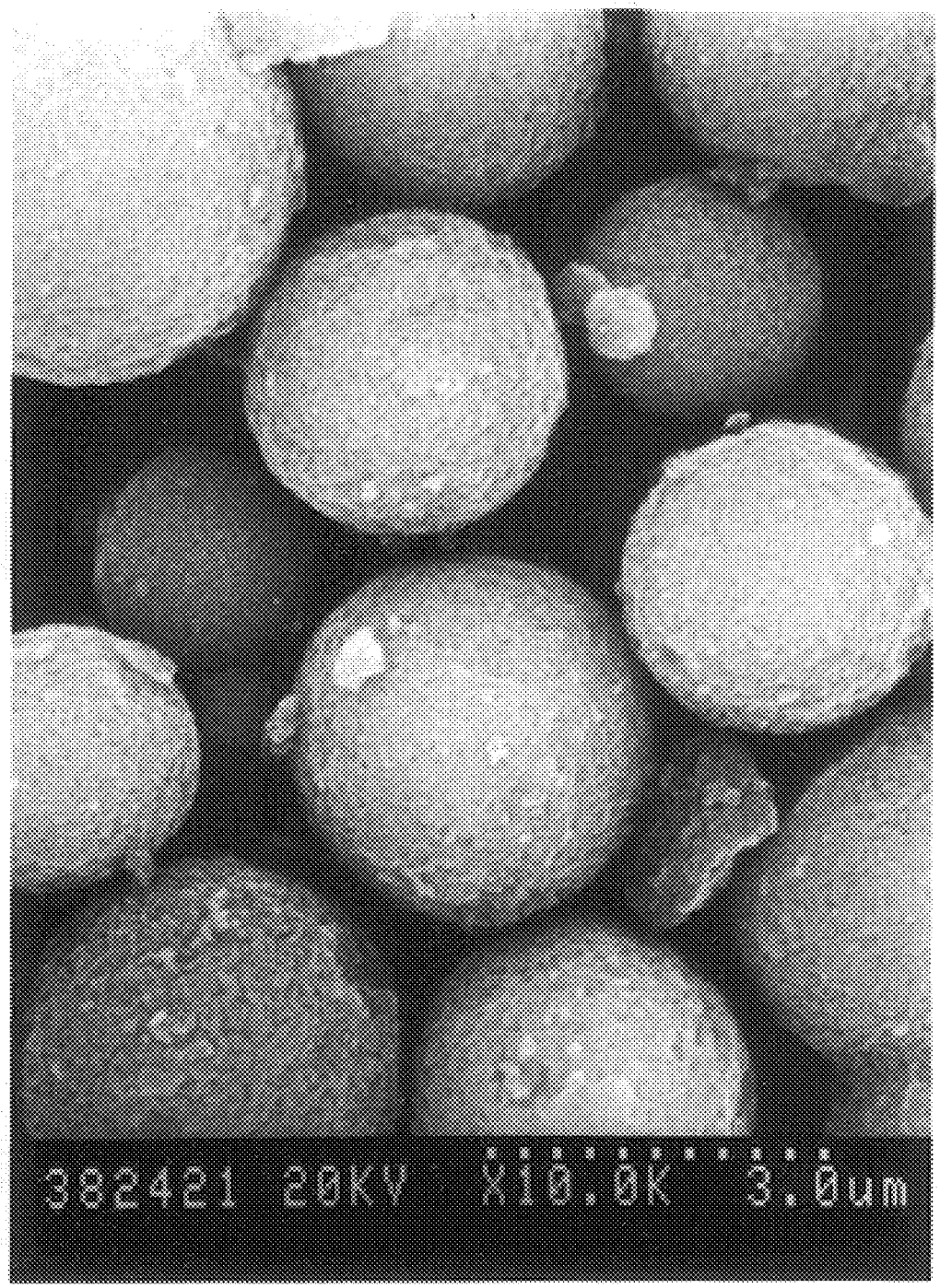
FIG. 4 is an electron microphotograph (magnification of 10000 times) illustrating the granular structure of spherical amorphous silica particles obtained in Example 1 of the present invention.
Figure 5:
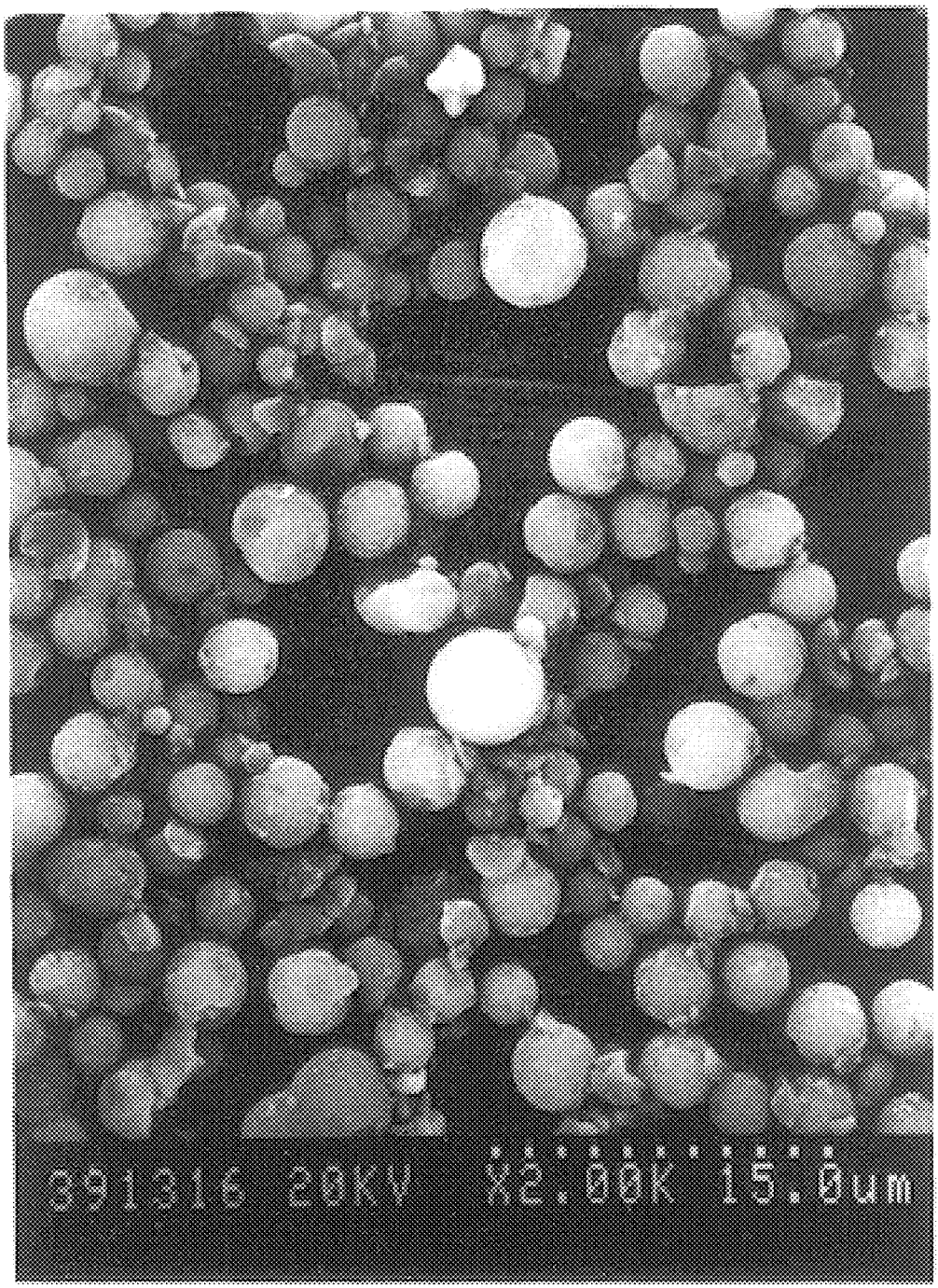
FIG. 5 is an electron microphotograph (magnification of 2000 times) illustrating the granular structure of spherical amorphous silica particles obtained in Example 2 of the present invention.
Figure 6:
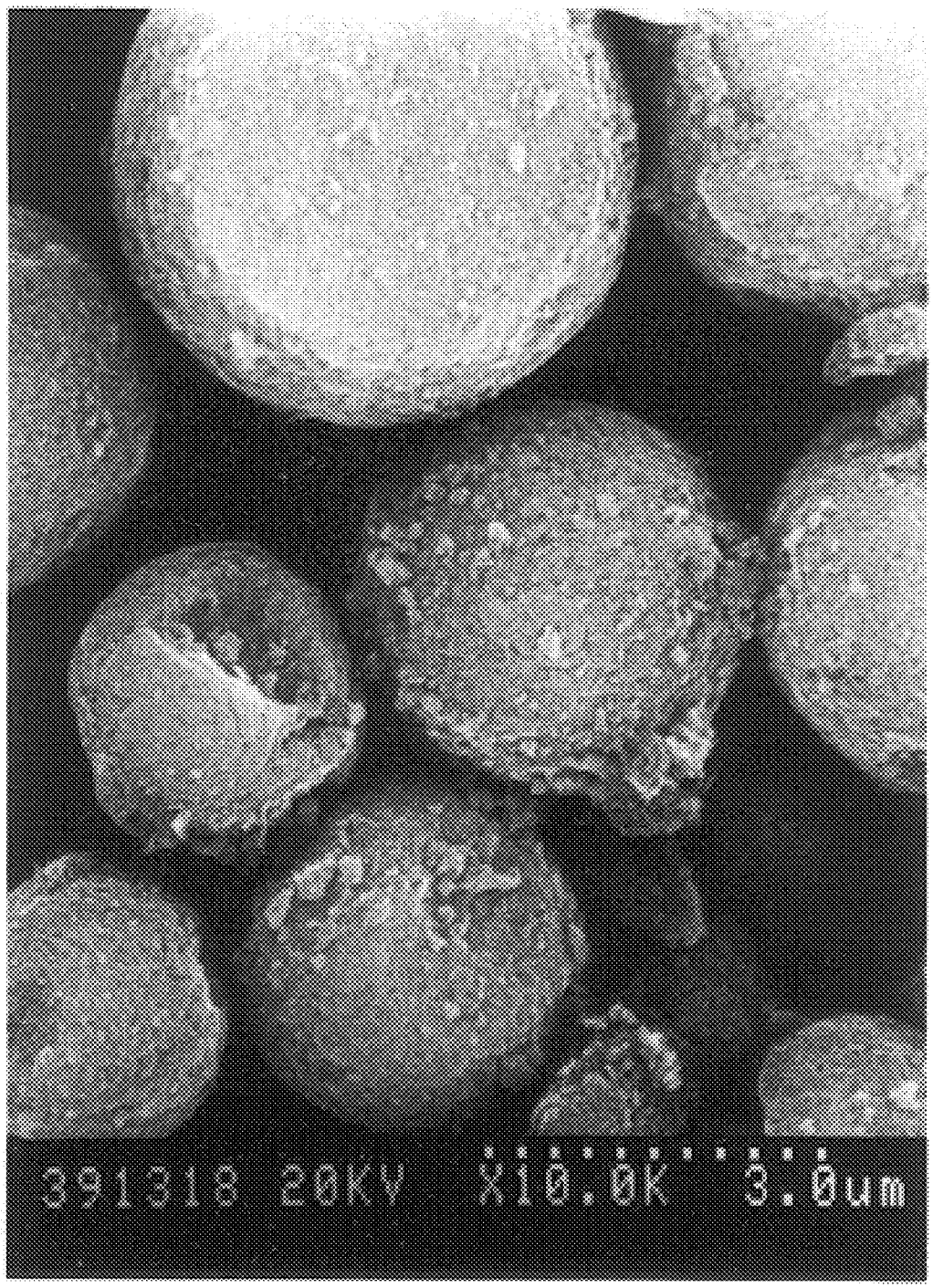
FIG. 6 is an electron microphotograph (magnification of 10000 times) illustrating the granular structure of spherical amorphous silica particles obtained in Example 2 of the present invention.

That is, FIGS. 1 and 2 illustrate a granular structure of amorphous silica obtained by adding CMC of an etherification degree of 0.45 in an amount of 8.57% per the total weight of $SiO_2$ and wherein FIG. 1 illustrates the granular structure at a magnification of 2000 times and FIG. 2 illustrates the granular structure at a magnification of 10000 times. FIGS. 3 and 4 illustrate the particles obtained by adding CMC having an etherification degree of 1.25 in an amount of 14.3%, and FIGS. 5 and 6 illustrate the particles obtained by adding CMC having an etherification degree of 1.4 in an amount of 11.4%, the magnifications being the same as those of FIGS. 1 and 2.

It will be understood from these SEM photographs that the amorphous silica precipitate is a gelled product of indefinite shape when the etherification degree is 0.45, but there is obtained spherical amorphous silica of a definite shape which is very close to sphericalness when the etherification degree is not smaller than 0.5.

The granular shape and yield of amorphous silica vary to some extent depending upon the polymerization degree of CMC that is used, amount of CMC added, concentration of $SiO_2$ in a mixture solution of the alkali silicate and CMC, viscosity of the mixture solution, and a coagulation growth assisting agent. Use of the CMC having an etherification degree of larger than 1 broadens the above-mentioned conditions that can be tolerated, and helps obtain better filtering property and better yield than those having etherification degrees of not larger than 1 during the practical process for production, and further makes it possible to obtain particles having definite shapes and sizes. It is of course possible to obtain a precipitate having a spherical shape even by using CMC with the etherification degree of not larger than 1 by selectively combining the above-mentioned conditions and, particularly, by using a coagulation growth assisting agent, maintaining a suitable degree of filtering property and an improved yield (see Tables 1 to 3 appearing later).

Making present the coagulation growth assisting agent composed of an inorganic electrolyte or any other water-soluble high molecular polymer in the mixture solution prior to effecting the partly neutralization, is effective in assisting the action of the CMC, in growing amorphous silica in a spherical shape and in increasing the yield thereof, and is particularly effective when the CMC that is used has a small etherification degree or when the CMC is used in a small amount.

Figure 7:
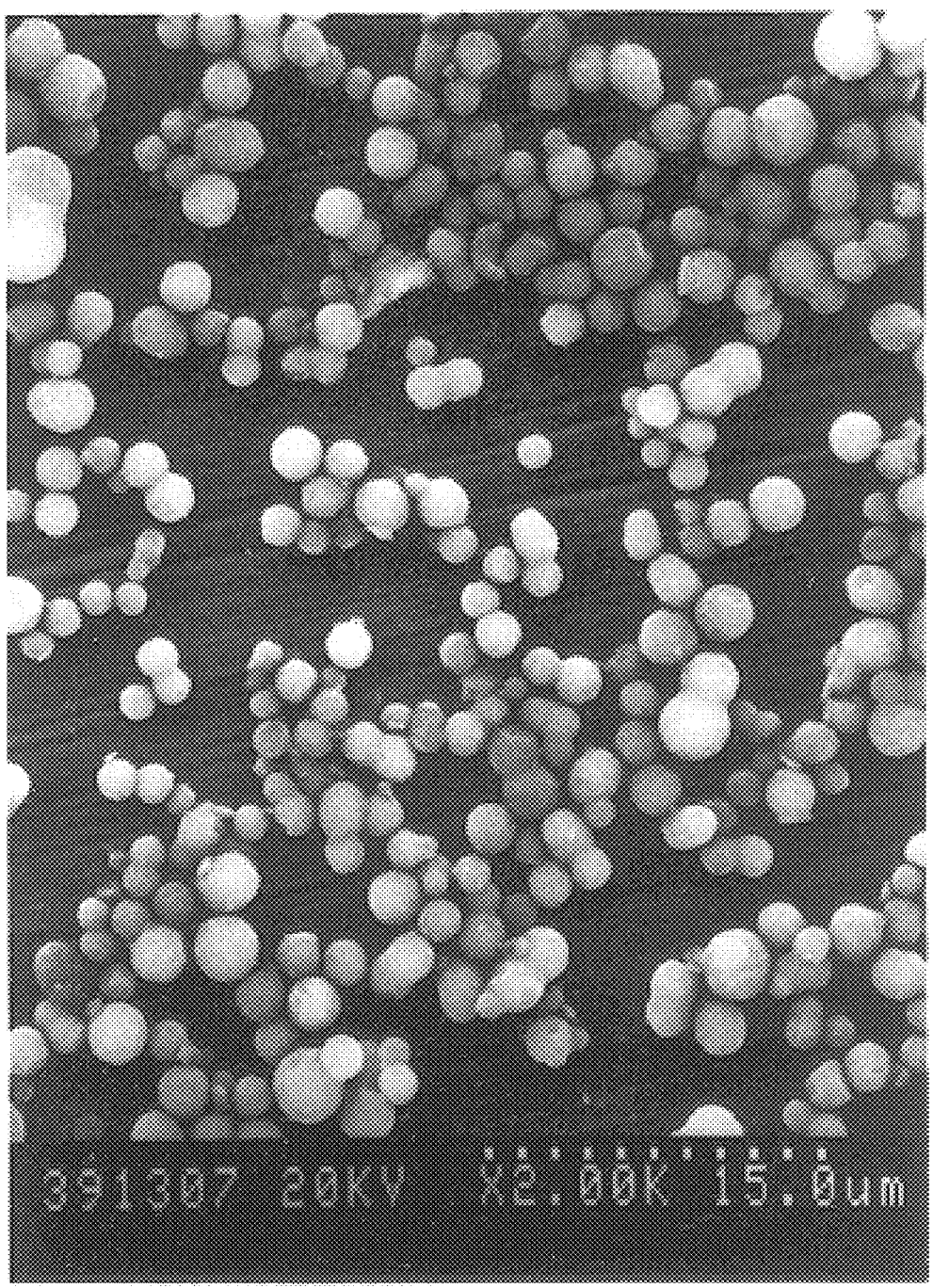
FIG. 7 is an electron microphotograph (magnification of 2000 times) illustrating the granular structure of spherical amorphous silica particles obtained in Example 5 of the present invention.
Figure 8:
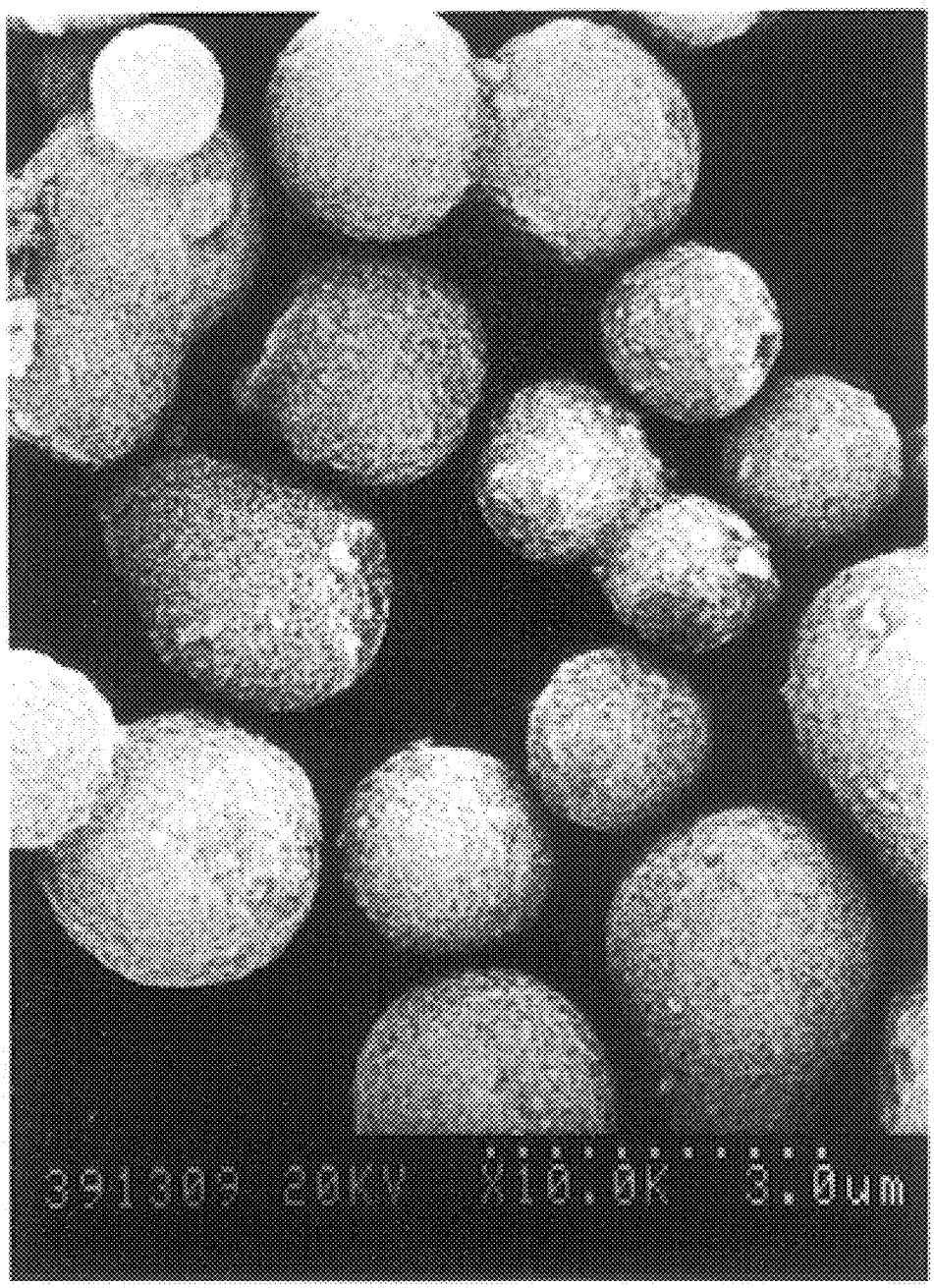
FIG. 8 is an electron microphotograph (magnification of 10000 times) illustrating the granular structure of spherical amorphous silica particles obtained in Example 5 of the present invention.

FIGS. 7 and 8 are scanning-type electron microphotographs illustrating the granular structure of a granular amorphous silica of the present invention obtained by adding CMC having an etherification degree of 0.65 in an amount of 11.4% and, at the same time, by making NaCl present in an amount of 10% the total weight of $SiO_2$, from which it will be understood that the particles have a uniform and nearly spherical shape.

In order that the CMC exhibits the action for coagulating the partly neutralized silica to precipitate granular amorphous silica in a spherical shape maintaining an increased yield according to the present invention, the mixture solution should not have a large viscosity and the precipitated granular material should be easily filtered. From the standpoint of filtering property of the precipitated silica particles and, particularly, from the standpoint of filtering rate, the viscosity of the aqueous solution containing 1% of CMC at a temperature of 25° C. should be not larger than 1000 cp (centipoises) and, particularly, not larger than 200 cp.

The factors that affect the viscosity of the mixture solution will include etherification degree of the CMC, its molecular weight (polymerization degree) and its amount of addition. As for the molecular weight of CMC, the average polymerization degree (P) should range from 10 to 3000 and, particularly, from 200 to 1000.

When P is small, the CMC must be added in an increased amount and when P is large, the viscosity increases even when the CMC is added in a small amount. Therefore, the above-mentioned range of P is suited for the present invention.

The amount of addition of CMC varies depending upon its etherification degree and its polymerization degree, but should be suitably selected over a range of from 1 to 100% by weight and, particularly, from 5 to 50% by weight silica ($SiO_2$) in the mixture solution. When the amount of its addition is too small, the coagulation growth is not sufficient and when the amount of its addition is too large, the mixture solution exhibits an increased viscosity giving disadvantage in economy. In view of the tendency in which the coagulation grows increasingly in proportion to an increase in the etherification degree, the amount of addition of CMC should be decreased when it has a high etherification degree in order to lower the viscosity of the mixture solution.

Figure 16:
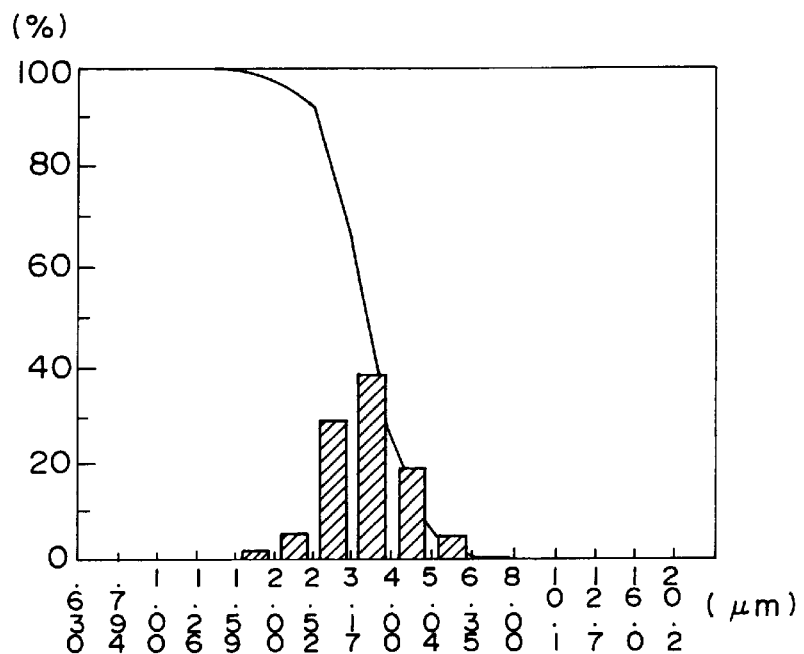
FIG. 16 is a diagram illustrating a volume-based particle size distribution of spherical amorphous silica particles of the present invention.
Figure 17:
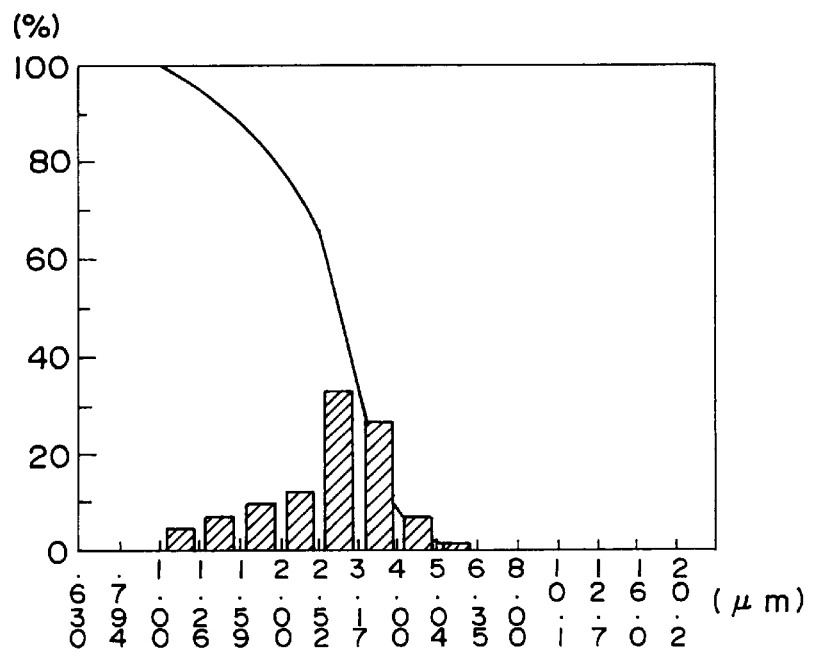
FIG. 17 is a diagram illustrating a number-based particle size distribution of spherical amorphous silica particles of the present invention.

FIGS. 16 and 17 are diagrams of a volume-based particle size distribution curve and of a number-based particle size distribution curve of the granular amorphous silica according to the present invention, from which it will be understood that the granular amorphous silica of the present invention exhibits a uniform grain size distribution which is close to a monodispersion.

In general, the degree of uniformity of particle diameters (particle sizes) can be evaluated in terms of a ratio ($D_{25}/D_{75}$) of a particle diameter ($D_{25}$) that corresponds to an integrated value 25% on an integrated particle size distribution curve and a particle diameter ($D_{75}$) that corresponds to an integrated value 75% on the same curve, and can more specifically be evaluated by a value of a relation (1), $$D_{25}/D_{75} \qquad (1)$$

wherein $D_{25}$ is a particle diameter of a value 25% on a volume-based integrated particle size distribution curve as measured by a Coulter counter method, and $D_{75}$ is a particle diameter of a value 75% thereof.

That is, the particle size distribution is narrow when this value is small and the particle size distribution is broad when this value is large.

According to the present invention, the feature resides in that the granular amorphous silica has uniform particle sizes in which the ratio $D_{25}/D_{75}$ in the volume-based distribution is not greater than 2.0 and, particularly, is not greater than 1.6.

Moreover, the sphericalness of the spherical particles can be evaluated in terms of a ratio ($D_S/D_L$) of a long diameter ($D_L$) to a short diameter ($D_S$) in the cross section (projected plane) of the particles. In the granular amorphous silica of the present invention, the particles having the sphericalness ($D_S/D_L$) over a range of from 0.90 to 1.00 occupy more than 80% of the whole amount, exhibiting excellent fluidizing property and dispersion property.

According to the present invention, the fact that a spherical product of a definite shape grows when the CMC is made present during the partial neutralization of the alkali silicate was discovered as a phenomenon through extensive study and is considered to have presumably stemmed from the following reasons though they have not yet been theoretically clarified to a sufficient degree.

That is, in the process of the present invention, it is considered that the granular product composed of a partly neutralized product of the alkali silicate is forming a fine structure in which spherical primary particles of silica in a colloidal form are gathering together like a cluster of grapes with the polymer chain of CMC as a core.

FIG. 18 schematically illustrates the fine structure of the granular material (wherein n denotes the amount of the silica which exists in the form of colloidal particles, and S denotes a cellulose polymer that forms CMC). As shown, a carboxyl group of CMC and a silanol group on the surface of silica are bonded together via a hydrogen bond or via an ionic crosslinking of a sodium ion that is interposed therebetween. In particular, the CMC having a large etherification degree used in the present invention contains large amounts of carboxyl groups that serve as joints to the silica particles, suggesting that CMC effectively contributes in coagulating and growing the silica particles. This attributes for an excellent effect of the carboxymethyl cellulose (CMC) of the present invention as a coagulation growing agent.

In the present invention, the fact that the CMC is contained in the precipitated spherical product composed of a partly neutralized product of an alkali silicate is confirmed by the fact that when the precipitated spherical product is neutralized with an acid, the CMC are extracted out of the particles together with an alkali component that is contained therein. Even during the neutralization with the acid, the granular product that is once formed is maintained in its own form, and components other than amorphous silica are removed, making it possible to obtain granular silica in a high yield maintaining a good spherical shape and a sharp particle size distribution.

The granular amorphous silica of the present invention is an agglomerate of primary particles of silica. Therefore, the BET specific surface area of silica becomes relatively broad depending upon the degree of aggregation, and usually ranges from 25 to 800 m$^2$/g and, particularly, from 100 to 600 m$^2$/g. Moreover, since the degree of aggregation is higher than that of silica gel and the like, the refractive index (25° C.) is as great as from 1.44 to 1.48.

Alkali Silicate

In the present invention, the alkali silicate used as a starting material has a composition represented by the formula (2), $$M_2O \cdot mSiO_2 \qquad (2)$$

wherein m is a number of from 1 to 4 and,
particularly, from 2.5 to 3.5, and M is an alkali
atom such as potassium or lithium,
and is particularly in the form of an aqueous solution of a sodium silicate. The composition of the alkali silicate is related to stability of the mixture solution, yield of the formed granular product and particle size. When the molar ratio(m) of SiO$_2$ is smaller than the above range, the partly neutralized particles precipitate little, the yield drops, the shape of the particles becomes nonuniform, and the acid is needed in an increased amount for effecting the partial neutralization. When the molar ratio of SiO$_2$ becomes greater than the above range, on the other hand, the mixture solution loses stability, the shape of the particles is deviated from the sphericalness, and the particle size distribution loses sharpness.

The concentration of the alkali silicate in the mixture solution should be from 3 to 10% by weight and, particularly, from 4 to 8% by weight as SiO$_2$.

Coagulation Growing Agent

In the present invention, the carboxymethyl cellulose (CMC) is used as the coagulation growing agent in an amount of from 1 to 100% by weight and, particularly, from 5 to 50% by weight per the whole silica (SiO$_2$) in the aqueous solution of alkali silicate.

Like the water-soluble polymers in general, the viscosity of CMC varies depending primarily upon the polymerization degree of the cellulose molecules forming the CMC. When the viscosity is high, it becomes difficult to grow and precipitate the granular product or to separate the granular product by filtration. It is desired that the CMC used in the present invention does not have so much high molecular weight, which should be from 10 to 3000 and, preferably, from 200 to 1000 in terms of the polymerization degree mentioned above.

The etherification degree of CMC and other conditions used in the present invention are as described above. According to the conditions specified by the present invention, the aforementioned structure of the aggregate of clusters is efficiently formed. The CMC easily dissolves in the water and may be added in the form of a powder. For easy handling, however, the CMC should be used by dissolving it in an aqueous solution in advance.

As mentioned earlier, furthermore, the CMC is extracted from the clustered aggregate by neutralization with an acid, most of it migrating into the filtrate. Therefore, the filtrate can be used again as the coagulation growing agent.

Coagulation Growth Assisting Agent

In the present invention, it is allowable to use a coagulation growth assisting agent composed of a water-soluble inorganic electrolyte or any other water-soluble high molecular polymer in combination with the CMC. As the water-soluble inorganic electrolyte, any inorganic electrolyte can be used provided it is soluble in water and exhibits the coagulating action for a sol and the like. There can be used a salt of a mineral acid or a salt of an organic acid of metals of the Groups 1, 2, 3 and 4 of the periodic table or of other transition metals. Suitable examples are as described below.

Alkali metal salts of mineral acids such as NaCl, Na$_2$SO$_4$; alkaline earth metal salts of mineral acids such as calcium chloride, magnesium chloride, magnesium sulfate and calcium nitrate; and other water-soluble metal salts such as zinc chloride, zinc sulfate, aluminum sulfate, aluminum chloride and titanyl sulfate.

Among them, the alkali metal salt is one of the preferred coagulation growth assisting agent. This is because the alkali metal salt is a component formed as a by-product during the partial neutralization or the complete neutralization, and is contained in a filtrate from which the final granular silica is isolated. By being added again to the mixture solution, the alkali metal salt can be effectively used again together with the CMC that is recovered.

On the other hand, a polyvalent metal salt exhibits a large coagulating action for a sol compared with a monovalent metal salt and works to coagulate the partly neutralized silica even when it is added in an amount smaller than that of the monovalent metal. When it is allowed to mix a polyvalent metal, therefore, it is allowed to use a polyvalent metal salt.

As the coagulation growth assisting agent, it is further allowable to use any other water-soluble high molecular polymer. That is, as required, there can be used a nonionic high molecular polymer that is compatible with the CMC, such as starch, gua gum, locust bean gum, gum arabi, tragacanth gum, British gum, crystal gum, Senegal gum, PVA, methyl cellulose, sodium polyacrylate, hydroxyethyl cellulose, methyl cellulose, ethyl cellulose, polyethylene glycol and the like in small amounts in combination with the CMC.

For this purpose, the other water-soluble high molecular polymer should be used in such an amount that does not so increase the viscosity of the mixture solution, i.e., should be used in an amount of not larger than 40% by weight and, particularly, not larger than 20% by weight per the whole amount of CMC used in the present invention.

Acid

As the acid, there can be used a variety of inorganic acids and organic acids. From the economical point of view, it is desired to use a mineral acid such as sulfuric acid, hydrochloric acid, nitric acid and phosphoric acid. Among them, sulfuric acid is most excellent from the standpoint of yield of the granular product and uniformity in the particle diameter and shape. In order to carry out the homogeneous reaction, it is desired to use the acid in the form of a dilute aqueous solution and usually at a concentration of from 1 to 15% by weight. It is further allowable to add to these acids a water-soluble electrolyte such as NaCl or the like and, particularly, an acidic salt or a neutral salt. The amount of the acid that is mixed should be such that a homogeneous mixture solution (which is transparent) is formed by the partial neutralization and that the pH of the mixture solution is from 10.2 to 11.2 and, particularly, from 10.5 to 11.0.

Precipitation of Granular Product

In the present invention, there is no limitation in the order of adding the above-mentioned components. For instance, the CMC may be added after the acid is added to the alkali silicate aqueous solution or, conversely, the acid may be added after the CMC is added to the alkali silicate aqueous solution. They may be added at the same time, as a matter of course. The coagulation growth assisting agent may be used as an aqueous medium for adding various components, or may have been added to the acid in advance. The components are mixed together to a sufficient degree and are homogenized, and, then, the mixture solution is left to stand still so that a partly neutralized granular product is precipitated.

The precipitation conditions usually consist of leaving the mixture solution to stand at a temperature of from 0 to 100° C. and, preferably, from 10 to 40° C. for from about 1 to about 50 hours and, preferably, from about 3 to about 20 hours. Usually, the particle diameter of the precipitated particles increases with a decrease in the temperature and the particle diameter of the precipitated particles decreases with an increase in the temperature. Thus, one of the advantages of the present invention is that the granular product is controlled by controlling the temperature. The precipitated particles and the mother liquor are isolated from each other, and the particles dispersed again in the water are neutralized by adding an acid, and are washed with water, dried, as required, furthermore, calcined from 200 to 800° C. and are classified to obtain a product. The isolated mother liquor and the dispersion solution after neutralization contain unprecipitated silica component and CMC, which can be effectively used again in the next time of precipitation.

As required, furthermore, the mixture solution may have been blended with any silica sol having fine particle diameters, silica gel or an anhydrous silica powder as a nucleating agent or a filler in an amount mentioned above per the whole weight of silica ($SiO_2$). Silica that is used should have a particle diameter of the order of submicrons.

As required, furthermore, the mixture solution may be blended with fine particles and, particularly, particles of submicrons of hydroxides and oxides such as of titanium, zirconium, tin, selenium, bismuth and antimony in addition to silica, or with any sol or slurry fine metal particles such as of nickel, stainless steel or gold, in order to obtain spherical silica particles in which the above-mentioned particles are uniformly dispersed as contemplated by the present invention.

As a suitable example of silica sol, there can be favorably used Snowtex® (produced by Nissan Kagaku Co.) and Ludox® (produced by Dupont Co.). It is, however, also allowable to use an acidic silica sol that is obtained by treating the alkali silicate with a mineral acid.

As the silica sol or the anhydrous silica powder having fine particle diameters, there can be favorably used Aerosil (produced by Nippon Aerosil Co.) and fumed silica (produced by W. R. Grace and Co.). The dry method silica has a fine primary particle diameter but has been coagulated into considerably large secondary particles. It is therefore desired to subject the dry method silica to the wet-type pulverization to use it as a slurry having a dispersion particle diameter of smaller than 1 $\mu$m. Silica obtained by hydrolyzing an organic silane such as trialkoxy silanes is hydrophobic, has a fine primary particle diameter containing little particles that are coagulated, and is suited for imparting hydrophobic property.

It is further allowable to add, as nucleating agents, pigment particles such as titanium white, zinc flower, red iron oxide, iron black, yellow iron oxide, zeolite, hydrotalcite, lithium aluminum carbonate, titanium yellow, chromium oxide green, ultramarine, prussian blue, calcium carbonate and carbon black which are relatively fine particles.

In the present invention, furthermore, it is allowable to blend the system with such organic components as plasticizer, lubricating agent, antistatic agent, fogging-preventing agent, ultraviolet-ray absorbing agent, infrared-ray absorbing agent, antioxidizing agent and antibacterial agent in amounts that do not impair the action of the coagulating growing agent for the CMC, in addition to blending the above-mentioned inorganic components.

Granular Amorphous Silica

The granular amorphous silica according to the present invention has novel properties in combination, i.e., has a BET specific surface area of from 25 to 800 $m^2/g$ as mentioned earlier, has a particle diameter over a range of from 0.3 to 50 $\mu$m, the particles as a whole having a clearly spherical shape, not smaller than 80% of the particles having the sphericalness expressed by a ratio ($D_S/D_L$) of a long diameter ($D_L$) to a short diameter ($D_S$) of the particles of from 0.90 to 1.00, and further has a sharpness in the particle size distribution as defined by the aforementioned formula (1) of from 1.2 to 2.0, and a refractive index of from 1.44 to 1.48.

Moreover, the granular amorphous silica may be blended with a metal soap, resin acid soap, various resins or waxes, a coupling agent of the type of silane, alumina, titanium or zirconium, various oils, and may further be coated with oxides or hydroxides of various metals or silica, as required.

It is further possible to react an alkali earth metal such as magnesium, calcium, barium or strontium, or zinc in the form of a hydroxide, an oxide, a salt of an inorganic acid or a salt of an organic acid with the surfaces of the spherical particles of the partly or completely neutralized product of alkali silicate obtained by the present invention which is serving as a precursor, so that the precursor maintains its granular structure and that the surface layer of the particles is modified into a porous spherical silicate such as magnesium phillosilicate, zinc phillosilicate or the like. Depending upon the kind of metal, the surface becomes oleophillic exhibiting particularly excellent dispersion property in the resin and, further, exhibiting de-odoring action and odor-extinguishing action. The hydroxides of the alkaline earth metals may be used in an amount of from 1 to 20% by weight as oxides per the whole amount.

By utilizing these properties, the amorphous silica particles of the present invention can be used being blended in a variety of thermoplastic resins like olefin resins such as a crystalline propylene polymer (homopolymer of propylene or ethylene-propylene copolymer), a low-, intermediate- or high-density or linear low-density polyethylene, an ionically crosslinked olefin copolymer, an ethylene-vinyl acetate copolymer and an ethylene-acrylic ester copolymer; thermoplastic polyester such as a polyethylene terephthalate, a polybutylene terephthalate and the like; polyamide resins such as 6-nylon, 6.6-nylon, 6.8-nylon; chlorine-containing resins such as a polyvinyl chloride, a polyvinylidene chloride and the like; polycarbonates; and polysulfones. In particular, the amorphous silica particles can be used for resin molded articles such as a variety of drawn, undrawn and inflation films to impart slipping property and antiblocking property.

To accomplish this object, the amorphous silica can be blended in an amount of from 0.01 to 10 parts by weight and, particularly, from 0.02 to 2 parts by weight per 100 parts by weight of the thermoplastic resin.

Moreover, the amorphous silica can be used for a variety of applications being blended in various paints, extender pigments for inks, adhesives and coating resin compositions, and can be further blended as a carrier or a filler for medicines, foods, agricultural chemicals and insecticidal agents. Concretely speaking, the amorphous silica can be used for a fluidity-improving agent for toners, high-grade polishing agents, delustering fillers, carrier for chromatography, perfume carrier, filler for putty, adsorbing agent, fluidity-improving agent, parting agent, filler for rubbers, base agent for ceramics and for basic agents for cosmetics such as powder foundation, paste-like foundation, baby powder, cream, sweat controlling agent and the like.

EXAMPLES

The present invention will now be described by way of the following Examples. Here, the granular amorphous silica was measured for its physical properties and were evaluated by way of the methods described below.

(1) Particle size

Measured in compliance with the Coulter counter method (TA-11, produced by Coulter Electronics Co.) by using an aperture tube of 50 $\mu$m.

(2) Particle Size by SEM

Twenty representative particles are selected from the image of a photograph obtained by using a scanning-type electron microscope (S-570, produced by Hitachi, Ltd.), diameters of the particle images are measured by using a scale, and their average value is regarded to be a diameter of primary particles.

(3) Sphericalness

Twenty representative particles are selected from the image of a photograph obtained by using a scanning-type electron microscope (S-570, produced by Hitachi, Ltd.), long diameters and short diameters of the particle images are measured by using a scale to find an average value in compliance with the following relation (3), $$\text{Sphericalness} = \text{short diameter } (D_S)/\text{long diameter } (D_L) \times 100 \quad (3)$$

(4) Refractive Index

A solvent ($\alpha$-bromonaphthalene, kerosine) having a known refractive index is prepared by using Abbe refractometer. Then, in accordance with Larsen's oil immersion, several milligrams of the sample powder is placed on a slide glass, a droplet of the solvent having the known refractive index is added, a cover glass is placed thereon, and movement of Becke line is observed by using an optical microscope.

(5) Specific Surface Area, Porous Volume

Measured in compliance with the BET method by using Sorptomatic Series 1800 produced by CARLO ERBA Co.

(6) Yield

The dry product that is obtained is measured for its weight, reckoned as an anhydride (found from the ignition loss at 860° C.), and is divided by the amount of $SiO_2$ found from the analytical value in the sodium silicate that is thrown to find the yield in accordance with the following relation (4), $$\text{Yield (\%)} = \text{weight of the anhydride (g)/weight of } SiO_2 \text{ that is thrown (g)} \times 100 \quad (4)$$

(7) Chemical Composition

Measured in compliance with a method of analyzing silica, JIS M-8852.

(8) Etherification Degree Ash Alkali method

About one gram of the sample is accurately weighed, introduced into a ceramic crucible or a platinum crucible, mildly heated and carbonized, and is then incinerated at a temperature that does not exceed 600° C.

After cooled, the crucible is introduced into a 500-ml beaker, about 250 ml of water is poured, and N/10 sulfuric acid is added in an amount of just 50 ml, followed by boiling for 30 minutes.

After cooled, an excess of the acid is titrated with an N/10 caustic soda solution using phenolphthalein as an indicator. A blank test is similarly carried out.

Another sample is measured for its alkalinity or acidity, and the etherification degree ($D_S$) is calculated in compliance with the following relations (5) and (7) (applied to those having a purity of not smaller than 95%), $$A = \frac{(N \text{ of blank test}/10\text{NaOH ml} - N/10\text{NaOH ml}) \times F}{\text{anhydrous sample}} \quad (5)$$

− alkalinity

+ acidity

To measure the alkalinity and acidity, about one gram of the sample is accurately weighed and is dissolved in about 200 ml of the water. N/10 sulfuric acid is added in an amount of just 5 ml followed by boiling for 10 minutes. After cooled, the acid is titrated with an N/10 caustic soda solution using phenolphthalein as an indicator, and the alkalinity or the acidity is calculated in compliance with the following relation (6). The value having a positive sign represents the alkalinity. When the value has a negative sign, its absolute value represents the acidity.

alkalinity(+)ml 5×F'−N/10NaOHml×F acidity(−)ml anhydrous sample (g) (6)

F: factor of N/10NaOH

F': factor of N/10$H_2SO_4$ $$X(DS) = \frac{162A}{10.000 - 80A} \quad (7)$$

(expressed to two decimals, third decimal is rounded)

Example 1

A commercially available sodium silicate No. 3 ($SiO_2$ 22.0%, $Na_2O$ 7.0%, $SiO_2/Na_2O$=3.25) was weighed by an amount of 477 g (7% as an $SiO_2$ concentration in the whole solution) and was introduced together with 53 ml of pure water into a 2-liter stainless steel beaker, followed by the addition of 525 g (CMC/SiO$_2$=0.15) of an aqueous solution containing 3% of carboxymethyl cellulose (etherification degree of 1.25, polymerization degree of about 550, viscosity of 1% aqueous solution of 75 cp/25° C.) with stirring by using a Hi-Stirrer. After sufficiently dispersed, the mixture was held in a constant-temperature bath maintained at 20° C. Then, 445 g of a 5% sulfuric acid (H$_2$SO$_4$/Na$_2$O=0.42) that has been adjusted to 20° C. was slowly added with stirring (pH after the sulfuric acid was poured was 10.8). After the addition has been finished, the stirring was halted, and the mixture was left to stand still at that temperature for 12 hours.

After left to stand still for 12 hours, the precipitate and the mother liquor were separated from each other by filtration, the obtained cake was dispersed again in the pure water to a sufficient degree, 5% sulfuric acid was added thereto until pH was 3.0. After the pH was nearly stabilized at 3.0, the mixture was stirred for one hour, filtered, washed with water, dried overnight at 110° C. in a constant-temperature dryer, and was pulverized using a sample mill to obtain a fine granular silica powder having a spherical shape.

Figure 13:
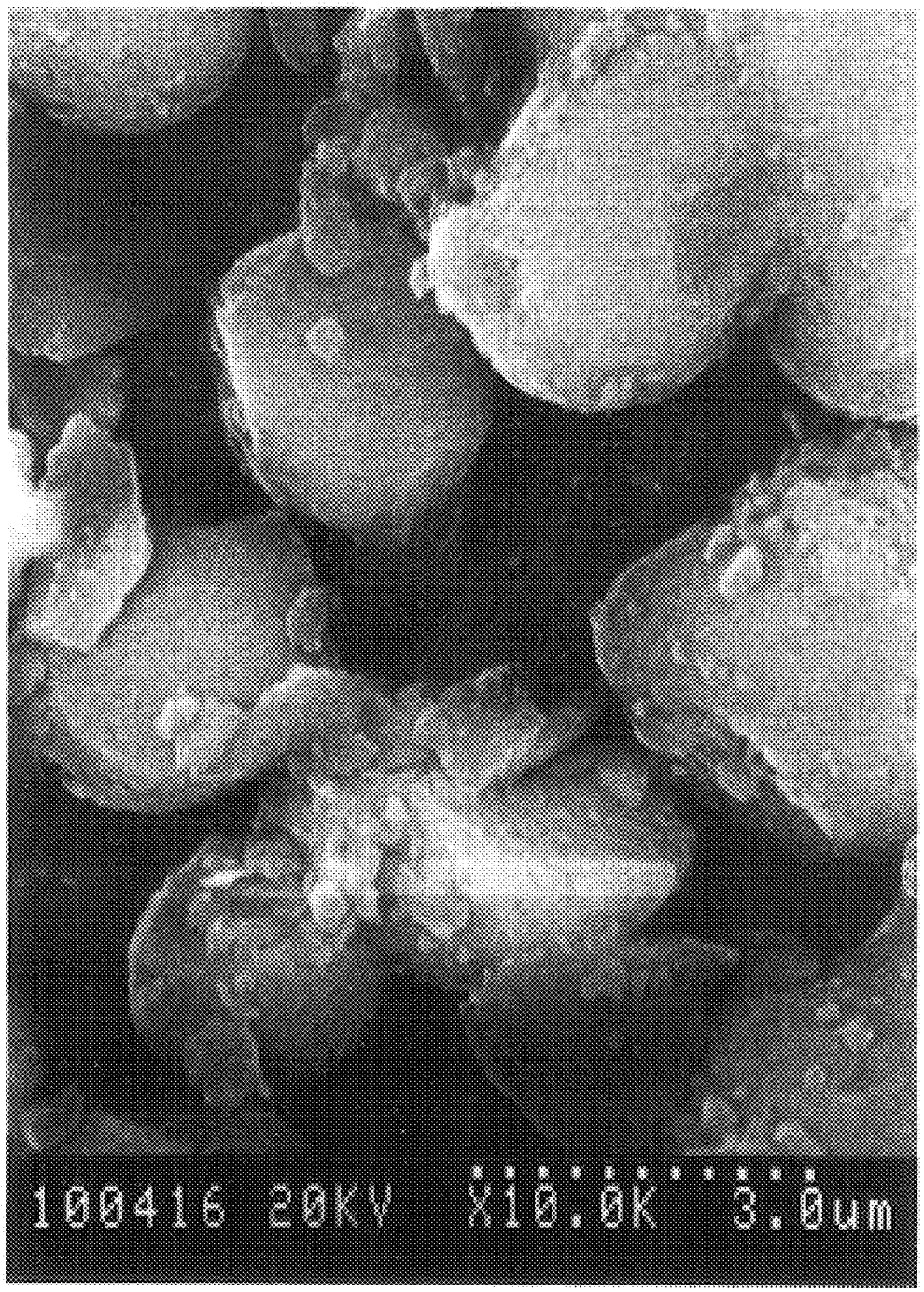
FIG. 13 is an electron microphotograph (magnification of 2000 times) illustrating the granular structure of spherical amorphous silica particles obtained in Comparative Example 6.
Figure 14:
FIG. 14 is an electron microphotograph (magnification of 10000 times) illustrating the granular structure of spherical amorphous silica particles obtained in Comparative Example 7.

X-ray diffraction proved the powder to be amorphous. Table 1 shows the properties of the powder, FIGS. 3 and 4 are electron microphotographs (SEM) of the powder, and FIGS. 13 and 14 illustrate a particle size distribution (volume-based) and a particle size distribution (number-based) as found by the Coulter counter method.

Examples 2 to 4

Fine spherical silica powders were prepared in the same manner as in Example 1 but using CMC having an etherification degree of 1.4, a polymerization degree of about 600 and a viscosity of 1% aqueous solution of 105 cp/25° C. (Example 2), using CMC having an etherification degree of 1.7, a polymerization degree of about 250 and a viscosity of 1% aqueous solution of 35 cp/25° C. (Example 3), and using CMC having an etherification degree of 2.25, polymerization degree of about 800 and a viscosity of 1% aqueous solution of 170 cp/25° C. (Example 4). FIGS. 5 and 6 are electron microphotographs (SEM) of Example 2, and Table 1 shows properties of the powders obtained in Examples 2, 3 and 4.

Example 5

A fine spherical silica powder was obtained in the same manner as in Example 1 but using CMC having an etherification degree of 0.65, a polymerization degree of about 550 and a viscosity of 1% aqueous solution of 80 cp/25° C., using, as the acid, 5% sulfuric acid to which has been dissolved 10.5 g of NaCl, and adding the water such that the total amount of the solution was 1500 g. Table 1 shows the properties of this powder, and FIGS. 7 and 8 are electron microphotographs (SEM) of this powder.

Example 6

A fine spherical silica powder was obtained in the same manner as in Example 1 but using sodium silicate (SiO$_2$ 22.0%, Na$_2$O 0 7.0%, SiO$_2$/Na$_2$O=3.25) in an amount of 409 g (6% as an SiO$_2$ concentration in the whole solution, CMC/SiO$_2$=0.175), using 5% sulfuric acid in an amount of 407 g (H$_2$SO$_4$/Na$_2$O=0.45), and adding the pure water such that the total weight was 1500 g. Table 1 shows the properties of this powder.

Example 7

A fine spherical silica powder was obtained in the same manner as in Example 1 but using sodium silicate (SiO$_2$ 22.0%, Na$_2$O 7.0%, SiO$_2$/Na$_2$O=3.25) in an amount of 341 g (5% of an SiO$_2$ concentration in the whole solution, CMC/SiO$_2$=0.21), using 5% sulfuric acid in an amount of 377 g (H$_2$SO$_4$/Na$_2$O=0.5), and by adding the pure water such that the total weight was 1500 g. Table 1 shows the properties of this powder.

Examples 8 to 10

Fine spherical silica powders were prepared in the same manner as in Example 1 by maintaining the starting solution of before being mixed at temperatures of 5° C., 30° C. and 50° C. Table 2 shows the properties of these powders.

Example 11

A fine spherical silica powder was obtained in the same manner as in Example 1 but using sodium silicate in an amount of 545 g (8% of an SiO$_2$ in the whole solution), 3% CMC in an amount of 413 g (CMC/SiO$_2$=0.103), 5% sulfuric acid in an amount of 542 g (H$_2$SO$_4$/Na$_2$O=0.45) and by setting the temperature of the starting material at 10° C.

Example 12

The procedure was carried out in the same manner as in Example 7 but using sodium silicate (SiO$_2$ 22.0%, Na$_2$O 7.0%, SiO$_2$/Na$_2$O=3.25) in an amount of 341 g (5% of an SiO$_2$ concentration in the whole solution, CMC/SiO$_2$=0.5), using 5% sulfuric acid in an amount of 453 g (H$_2$SO$_4$/Na$_2$O= 0.6), and by adding the pure water such that the total weight was 1500 g. The stirring was halted, and the mixture solution was left to stand still for three hours.

After left to stand still for three hours, the mixture solution was stirred and dispersed, followed by the addition of 5% sulfuric acid until the pH was 3.0. When the pH was nearly stabilized at 3.0, the mixture solution was stirred for another one hour. The procedure was then carried out in the same manner as in Example 1, followed by calcinning at 500° C. for two hours to obtain a fine spherical silica powder.

Figure 9:
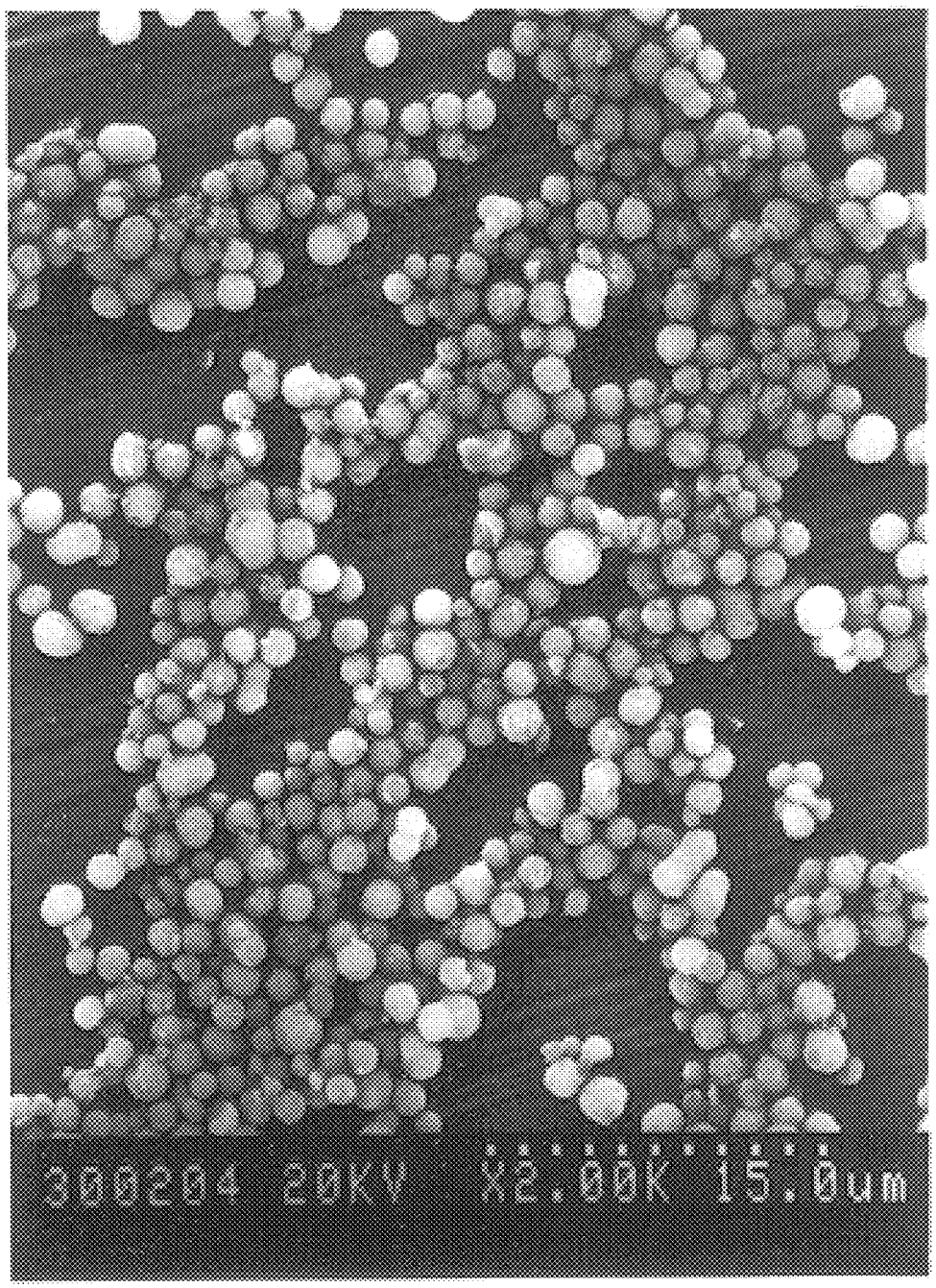
FIG. 9 is an electron microphotograph (magnification of 2000 times) illustrating the granular structure of spherical amorphous silica particles obtained in Example 12 of the present invention.
Figure 10:
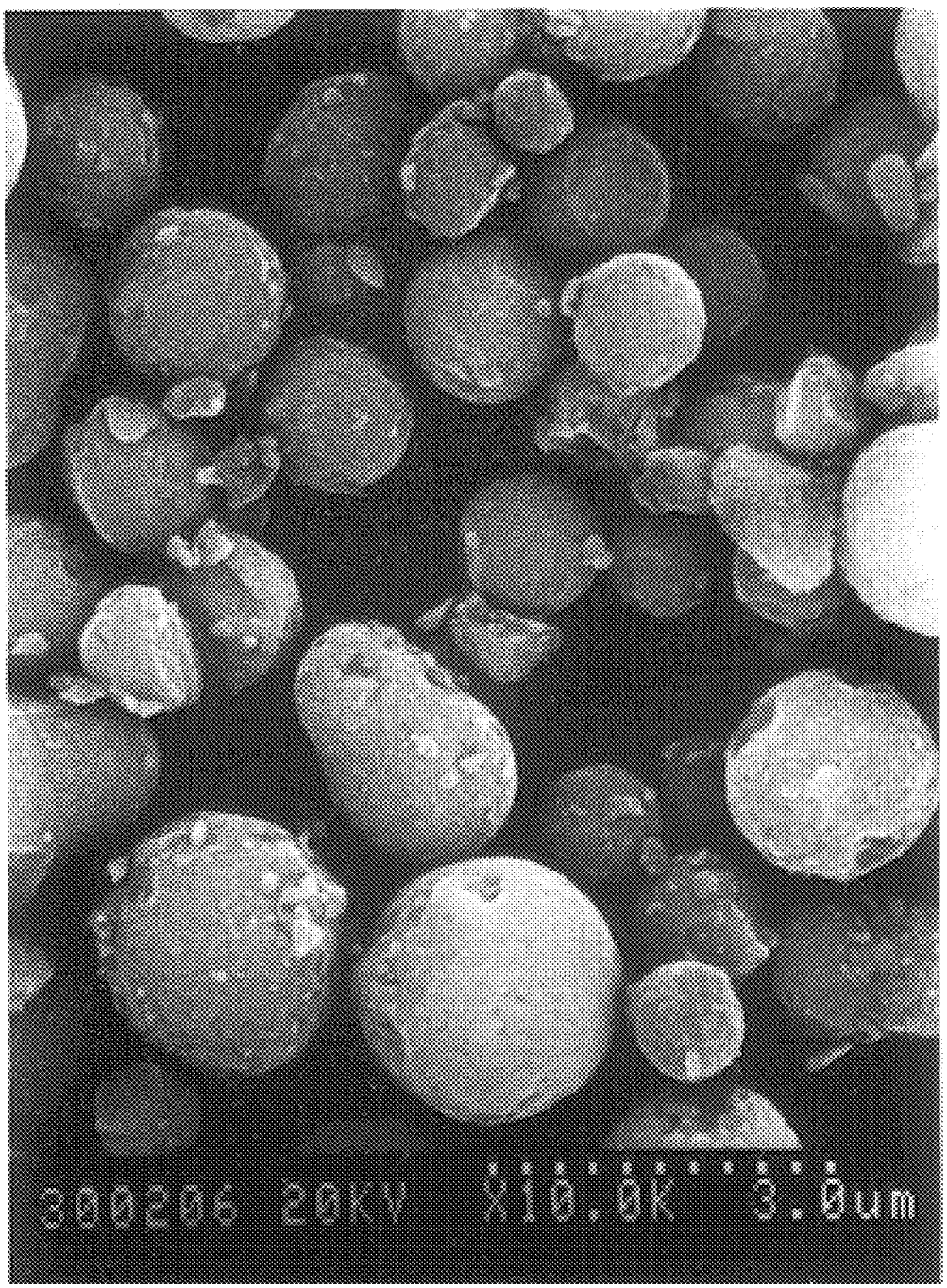
FIG. 10 is an electron microphotograph (magnification of 10000 times) illustrating the granular structure of spherical amorphous silica particles obtained in Example 12 of the present invention.

Table 2 shows the properties of this powder, and FIGS. 9 and 10 are electron microphotographs (SEM) of this powder.

Example 13

A commercially available sodium silicate No. 3 (SiO$_2$ 22.0%, Na$_2$O 7.0%, SiO$_2$/Na$_2$O=3.25) was weighed by an amount of 334 g (7% of an SiO$_2$ concentration in the whole solution) and was introduced together with 471 ml of the pure water into a 2-liter stainless steel beaker, followed by the addition of 5% sulfuric acid in an amount of 333 g (H$_2$SO$_4$/Na$_2$O=0.45) to adjust the pH to 10.5. The mixture solution was held in a constant-temperature bath maintained at 20° C.

Then, silica sol (Snowtex C, produced by Nissan Kagaku Co.) was slowly added in an amount of 210 g (30% reckoned as SiO$_2$) with stirring so that the mixture was not turbid white. Then, 525 g of an aqueous solution containing 3% of CMC (etherification degree of 1.25, polymerization degree of about 550, viscosity of 1% aqueous solution of 75 cp/25° C.) was added and was sufficiently dispersed. The stirring was then halted, and the mixture solution was left to stand still at that temperature for 15 hours. The pH was 10.4 at the time when the mixture solution was just left to stand still.

The procedure was then carried out in the same manner as in Example 1, followed by firing at 500° C. for two hours to obtain a fine spherical silica powder.

Figure 11:
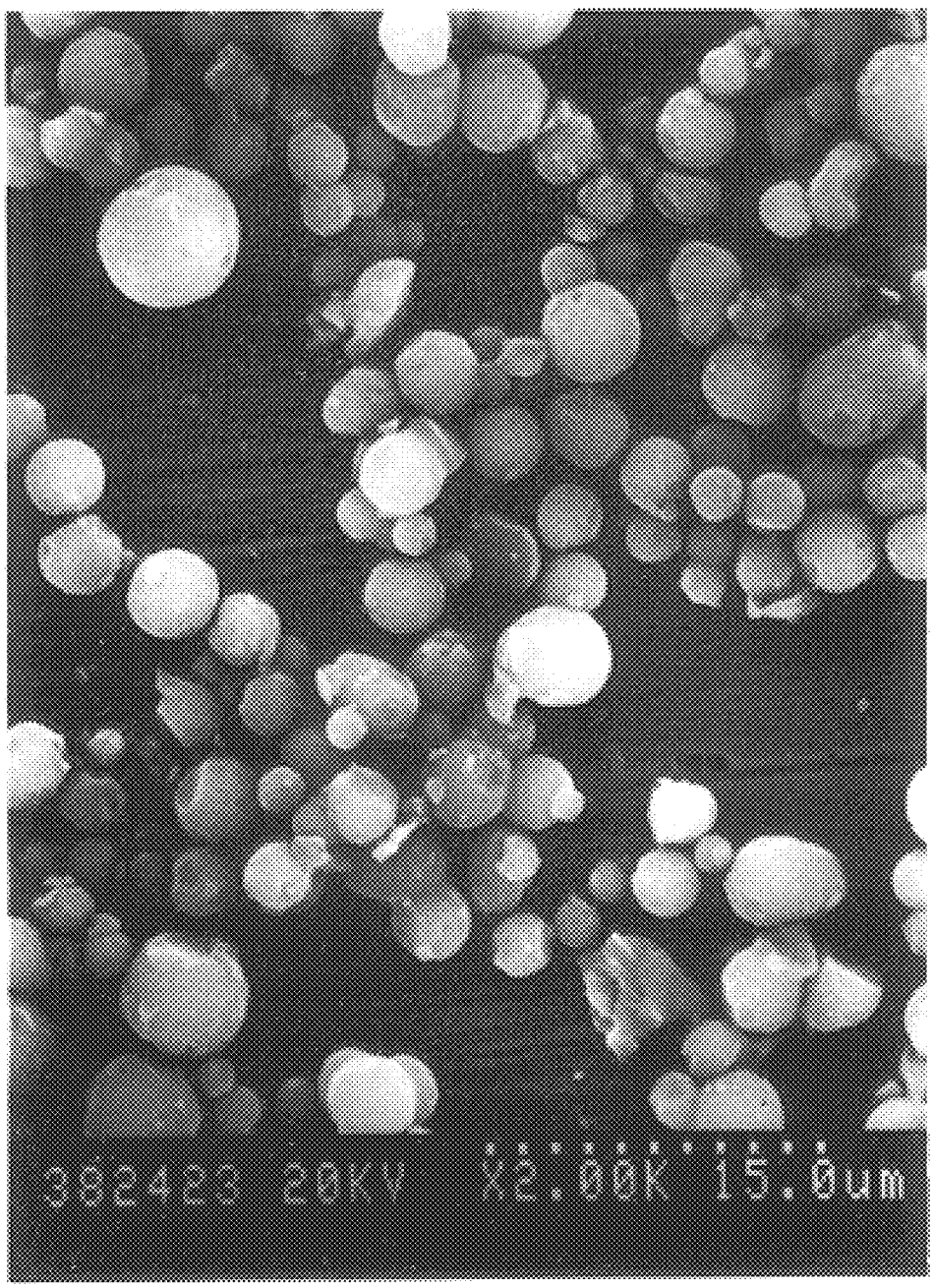
FIG. 11 is an electron microphotograph (magnification of 2000 times) illustrating the granular structure of spherical amorphous silica particles obtained in Example 13 of the present invention.
Figure 12:
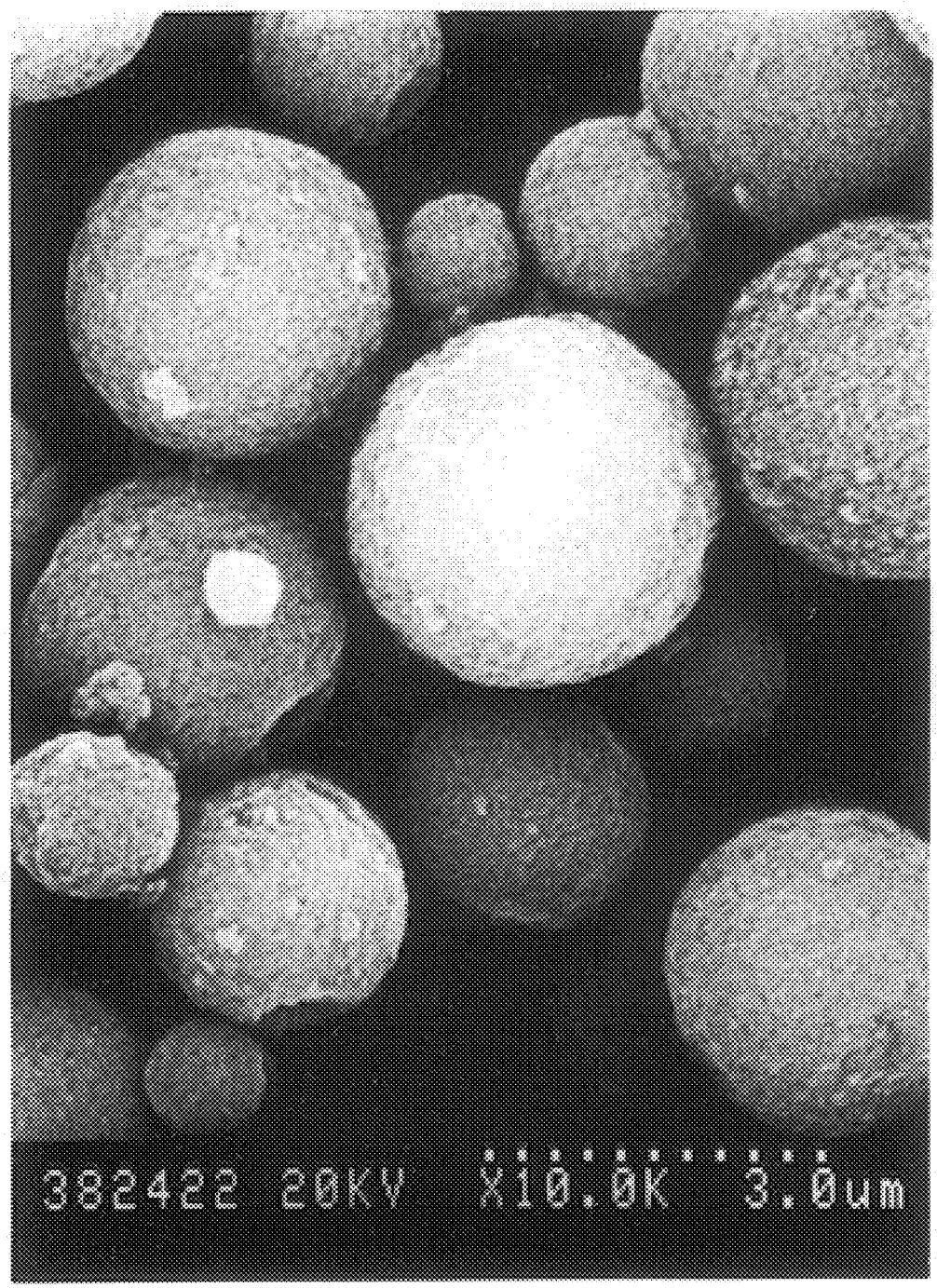
FIG. 12 is an electron microphotograph (magnification of 10000 times) illustrating the granular structure of spherical amorphous silica particles obtained in Example 13 of the present invention.

Table 2 shows the properties of this powder, and FIGS. 11 and 12 are electron microphotographs (SEM) of this powder.

Example 14

A commercially available sodium silicate No. 3 ($SiO_2$ 22.0%, $Na_2O$ 7.0%, $SiO_2/Na_2O=3.25$) was weighed by an amount of 477 g (7% of an $SiO_2$ concentration in the whole solution) and was introduced together with 508 ml of the pure water into a 2-liter stainless steel beaker, followed by the addition of 17.3 g (water content of 9%) of a CMC powder ($CMC/SiO_2=0.15$) having an etherification degree of 1.25, a polymerization degree of about 550 and a viscosity of 1% aqueous solution thereof of 75 cp/25° C. with stirring using Hi-Stirrer. After stirred and dissolved, the mixture solution was held in a constant-temperature bath maintained at 20° C.

The procedure was then carried out in the same manner as in Example 1 to obtain a fine spherical silica powder.

Table 2 shows the properties of this powder.

Example 15

The procedure was carried out in the same manner as in Example 7 but adding sodium silicate in an amount of 341 g (5% of the $SiO_2$ concentration in the whole solution), 673 g of the pure water and 33 g of the CMC powder (water content of 9%) having an etherification degree of 1.25, a polymerization degree of about 250 and a viscosity of 1% aqueous solution thereof of 18 cp/25° C. After stirred and dissolved, the mixture solution was held in a constant-temperature vessel maintained at 20° C.

Then, the procedure was carried out in the same manner as in Example 12 but adding 5% sulfuric acid in an amount of 453 g ($H_2SO_4/Na_2O=0.6$) to obtain a fine spherical silica powder.

Table 3 shows the properties of this powder.

Examples 16 and 17

The powder prepared in the same manner as in Example 1 was weighed in an amount of 100 g reckoned as an anhydride in a 1-liter beaker, the water was added thereto to form a 15% slurry thereof, followed by the addition of a magnesium hydroxide powder (No. 200 produced by Kamishima Kagaku Co.) in amounts reckoned as MgO shown in Table 3 with stirring using a magnetic stirrer. After sufficiently dispersed, the mixture solution was heated up to 98° C. in a hot bath, and was treated at this temperature for 8 hours. After the treatment is finished, the solid content was separated from the mother liquor by suction filtration, washed with water, and was dried overnight in a constant-temperature drier heated at 110° C.

The dried block-like product was pulverized using a sample mill, and was fired at 400° C. for one hour to obtain spherical and porous magnesium silicate powders.

Table 3 shows the properties of these powders.

Example 18

The powder prepared in the same manner as in Example 11 was weighed by an amount of 100 g (reckoned as an anhydride) in a 1-liter beaker, the water was added thereto to prepare a 15% slurry thereof and, then, a reagent magnesium nitrate ($Mg(NO_3)_2 \cdot 6H_2O$) was added little by little in an amount that corresponds to 10% of MgO with stirring by using a magnetic stirrer so that it was completely dissolved.

Then, a 28% ammonia water was added little by little to adjust the pH to 9.0 to 9.3. The mixture solution was then heated at 98° C. in a hot bath, and was treated at this temperature for two hours. The procedure was then carried out in the same manner as in Example 15 to obtain a spherical and porous magnesium silicate powder.

Table 3 shows the properties of this powder.

Examples 19 to 21

Spherical silicates were prepared in the same manner as in Example 15 but by adding barium hydroxide ($Ba(OH)_2$ (first-class reagent produced by Wako Junyaku Co.), calcium hydroxide ($Ca(OH)_2$ (first-class reagent produced by Wako Junyaku Co.) and strontium hydroxide ($Sr(OH)_2 \cdot 8H_2O$ (first-class reagent produced by Wako Junyaku Co.) instead of using magnesium hydroxide that was used in Example 16, in such amounts that BaO, CaO and SrO were contained each in an amount of 10%. Table 3 shows the properties of these powders.

Example 22

A fine spherical silica having an average particle size of 38 μm was prepared in the same manner as in Example 1 but using sodium silicate in an amount of 545 g (8% of $SiO_2$ concentration in the whole solution), 3% CMC in an amount of 240 g ($CMC/SiO_2=0.06$) and 5% sulfuric acid in an amount of 507 g ($H_2SO_4/Na_2O=0.42$) and further maintaining the temperature of the starting materials at 5° C. The properties were as follows:

$D_{25}/D_{75}$ 1.72, sphericalness 0.98, apparent specific gravity 0.72 g/ml, specific surface area 500 m²/g, porous volume 0.99 ml/g.

Comparative Example 1

An amorphous silica was prepared in the same manner as in Example 1 but using 300 g of a solution containing 3% of CMC ($CMC/SiO_2=0.0857$) having an etherification degree of 0.45, a polymerization degree of about 550 and a viscosity of 1% aqueous solution thereof of 80 cp/25° C. FIGS. 1 and 2 are electron microphotographs (SEM) of this powder, from which it was confirmed that the product did not grow into spherical particles.

Comparative Example 2

The procedure was carried out in the same manner as in Example 1 but using CMC having an etherification degree of 0.65, a polymerization degree of about 3200 and a viscosity of 1% aqueous solution thereof of 1700 cp/25° C. However, the viscosity was so high that the product was partly gelled and could not be almost filtered. It was not therefore possible to prepare spherical amorphous silica particles.

Comparative Examples 3 to 9

Silica particles were prepared in the same manner as in Example 1 but using a solution containing 4% of anionic high molecular sodium alginate (Comparative Example 3), a solution containing 5% of nonionic high molecular starch (MS-4600 produced by Nippon Shokuhin Kako Co.) (Comparative Example 4), a solution containing 5% of gelatin (Comparative Example 5), a solution containing 3% of CMC having an etherification degree of 2.6 (Comparative Example 6), a solution containing 4% of PVA (PVA-117 produced by Kurare Co.) (Comparative Example 7), an aqueous solution containing polyethylene glycol No. 400 (produced by Wako Junyaku Co.) and the water at a ratio of 1:3 (Comparative Example 8), and a solution containing 1% of cationic polyamine high molecular coagulating agent (MW=8,000,000) (Comparative Example 9), instead of using the CMC aqueous solution used in Example 1, and then washing the products with water without neutralizing them, washing them with a dilute acid and washing them with hot water. As a result, the products could be filtered very poorly and there were not obtained spherical particles having a uniform shape.

Figure 15:
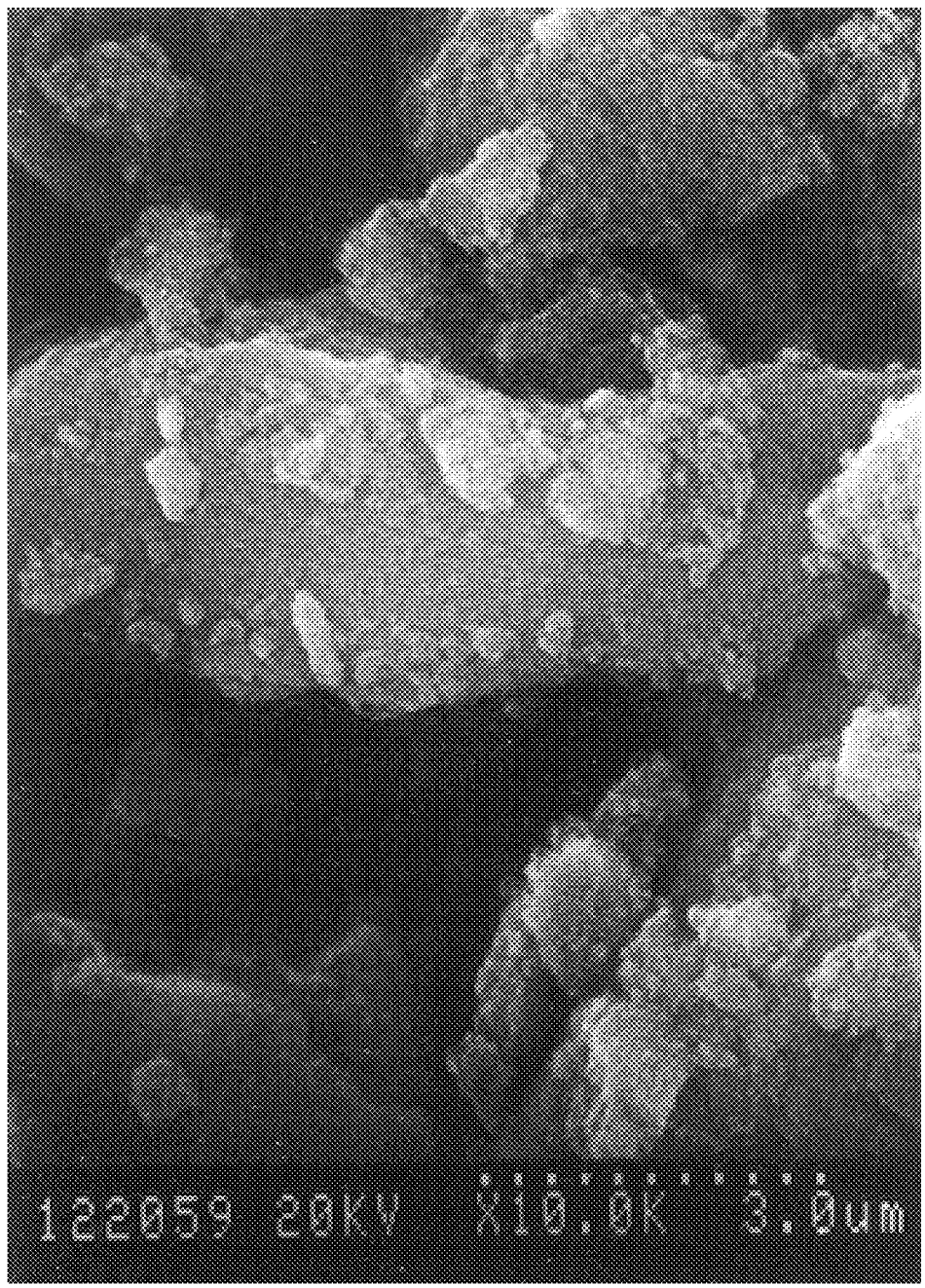
FIG. 15 is an electron microphotograph (magnification of 2000 times) illustrating the granular structure of spherical amorphous silica particles obtained in Comparative Example 8.

FIGS. 13, 14 and 15 are SEM photographs of the powders of Comparative Examples 6, 7 and 8.

TABLE 1

|  | Example 1 | Example 2 | Example 3 | Example 4 | Example 5 | Example 6 | Example 7 |
|---|---|---|---|---|---|---|---|
| Particle size | | | | | | | |
| Ave. particle diameter (μm) | 3.58 | 3.92 | 4.50 | 3.26 | 2.95 | 2.52 | 1.97 |
| $D_{25}/D_{75}$ | 1.52 | 1.48 | 1.52 | 1.60 | 1.52 | 1.62 | 1.58 |
| Particle diameter by SEM (μm) | 2–4 | 2–4 | 3–5 | 2–3 | 1.5–2.5 | 1–2 | 1–2 |
| Sphericalness | 0.97 | 0.95 | 0.96 | 0.94 | 0.95 | 0.92 | 0.92 |
| Refractive index | 1.45 | 1.46 | 1.45 | 1.45 | 1.45 | 1.46 | 1.45 |
| Apparent specific gravity (g/ml) | 0.31 | 0.38 | 0.45 | 0.28 | 0.40 | 0.41 | 0.48 |
| Apparent surface area (m²/g) | 543 | 590 | 480 | 502 | 426 | 514 | 630 |
| Porous volume (ml/g) | 0.67 | 0.59 | 0.78 | 0.88 | 0.52 | 0.66 | 0.48 |
| Yield (%) | 92.8 | 90.3 | 90.7 | 93.4 | 94.0 | 91.4 | 94.6 |
| Filtered | good | good | good | good | good | good | good |
| Chemical composition as dry product at 110° C.(%) | | | | | | | |
| Ig-loss | 5.0 | | 5.7 | | 6.7 | | 6.2 |
| $SiO_2$ | 94.7 | | 94.0 | | 92.9 | | 93.3 |
| $Na_2O$ | 0.31 | | 0.28 | | 0.42 | | 0.52 |
| $SO_2$ | none | | none | | — | | — |
| Remarks | FIG. 3, 4 | FIG. 5, 6 | | | FIG. 7, 8 | | |

TABLE 2

|  | Example 8 | Example 9 | Example 10 | Example 11 | Example 12 | Example 13 | Example 14 |
|---|---|---|---|---|---|---|---|
| Particle size | | | | | | | |
| Ave. particle diameter (μm) | 6.56 | 2.89 | 1.80 | 12.3 | 1.75 | 3.63 | 3.26 |
| $D_{25}/D_{75}$ | 1.56 | 1.66 | 1.67 | 1.66 | 1.68 | 1.59 | 1.58 |
| Particle diameter by SEM (μm) | 4–7 | 1–3 | 0.5–2 | 8–12 | 0.5–1.5 | 2–4 | 2–3 |
| Sphericalness | 0.96 | 0.93 | 0.92 | 0.97 | 0.92 | 0.97 | 0.94 |
| Refractive index | 1.45 | — | — | 1.46 | 1.45 | — | — |
| Apparent specific gravity (g/ml) | 0.46 | 0.34 | 0.21 | 0.52 | 0.43 | 0.36 | 0.46 |
| Apparent surface area (m²/g) | 482 | 433 | 380 | 390 | 592 | 325 | 477 |
| Porous volume (ml/g) | 0.78 | 0.89 | 1.06 | 0.86 | 0.43 | 0.65 | 0.67 |
| Yield (%) | 90.3 | 91.6 | 87.3 | 87.8 | 99.8 | 98.4 | 89.7 |
| Filtered | good | good | good | good | slightly poorly | good | good |
| Chemical composition as dry product at 110° C.(%) | | | | | | | |
| Ig-loss | | 7.3 | | 5.7 | | | |
| $SiO_2$ | | 92.6 | | 94.1 | | | |
| $Na_2O$ | | 0.10 | | 0.22 | | | |
| $SO_2$ | | none | | — | | | |
| Remarks | | | | | FIG. 9, 10 | FIG. 11, 12 | |

TABLE 3

|  | Example 15 | Example 16 | Example 17 | Example 18 | Example 19 | Example 20 | Example 21 |
|---|---|---|---|---|---|---|---|
| Particle size | | | | | | | |
| Ave. particle diameter ($\mu$m) | 1.38 | 3.42 | 3.58 | 11.8 | 3.32 | 3.78 | 3.55 |
| $D_{25}/D_{75}$ | 1.68 | 1.60 | 1.75 | 1.66 | 1.68 | 1.80 | 1.71 |
| Particle diameter by SEM ($\mu$m) | 0.5–1 | 2–4 | 2–4 | 8–12 | 2–4 | 2–4 | 2–4 |
| Sphericalness | 0.92 | 0.96 | 0.95 | 0.97 | 0.97 | 0.93 | 0.94 |
| Refractive index | — | 1.48 | 1.50 | 1.48 | 1.52 | 1.48 | 1.49 |
| Apparent specific gravity (g/ml) | 0.18 | 0.41 | 0.46 | 0.56 | 0.59 | 0.49 | 0.52 |
| Apparent surface area (m$^2$/g) | 375 | 73 | 280 | 102 | 29 | 236 | 107 |
| Porous volume (ml/g) | 0.88 | 0.18 | 0.38 | 0.20 | 0.04 | 0.27 | 0.11 |
| Yield (%) | 98.7 | — | — | — | — | — | — |
| Filtered | slightly poorly | — | — | — | — | — | — |
| Chemical composition as dry product at 110° C.(%) | | | | | | | |
| Ig-loss | 7.2 | 3.8 | 3.0 | 3.5 | 2.6 | 3.6 | 3.0 |
| SiO$_2$ | 92.7 | 91.5 | 78.6 | 87.7 | 88.4 | 87.8 | 88.4 |
| Na$_2$O | 0.1 | 0.1 | — | — | — | — | — |
| MO | — | 4.5(MgO) | 18.2(MgO) | 8.5(MgO) | 8.8(BaO) | 8.5(CaO) | 8.6(SrO) |

According to the present invention, amorphous silica having a high sphericalness and a clearly spherical shape is obtained maintaining a uniform particle size and in a high yield by adding a carboxymethyl cellulose (CMC) having an etherification degree of from 0.5 to 2.5 and, particularly, from 0.8 to 2 and a polymerization degree of from 10 to 3000 in an amount of 15 to 100% by weight reckoned as SiO$_2$ with respect to the silica in an aqueous solution of alkali silicate in a step of neutralizing the aqueous solution of alkali silicate with an acid. In this method, the coagulation growing agent that is used is a cheaply available CMC and presents such a merit that the amorphous silica particles can be produced at a reduced cost.

The obtained granular amorphous silica is in a spherical particulate form and has a BET specific surface area of from 25 to 800 m$^2$/g and a particle diameter of from 0.2 to 50 $\mu$m as observed by using a scanning-type electron microscope. Besides, the particles are uniform having sharply distributed average particle sizes and an apparent specific weight of from 0.1 to 0.8.

We claim:

1. A method of producing granular spherical amorphous silica particles consisting essentially of mixing an aqueous solution consisting essentially of an alkali silicate in concentration of 3 to 10% by weight calculated as SiO$_2$ and a coagulating growing agent polymer consisting essentially of carboxymethyl cellulose in an amount of 5 to 50% by weight based on the alkali silicate calculated as SiO$_2$, said carboxymethyl cellulose having an etherification degree of from 0.65 to 2.25, a polymerization degree of from 250 to 800 and a viscosity of the CMC as a 1% aqueous solution at 25° C. of 200 cP or less, and a partly neutralizing amount of acid aqueous solution, leaving the obtained mixture solution at a pH 10.2 to 11.2 to stand so that a partly neutralized granular spherical product of the alkali silicate is formed, and neutralizing the granular product with an acid, and recovering the neutralized granular spherical silica particles having a sphericalness of at least 0.90 in an about 90% or more yield of said granular spherical amorphous silica particles calculated as SiO$_2$ having uniform particle size in which the ratio $D_{25}/D_{75}$ in a volume-based distribution is less than 2.0.

2. A method according to claim 1, wherein the granular amorphous silica product has a BET specific surface area of from 25 to 800 m$^2$/g, a primary particle size of from 0.2 to 50 $\mu$m, and an apparent specific gravity of from 0.1 to 0.8.

3. A method according to claim 1, wherein the carboxymethyl cellulose has an etherification degree of from 0.8 to 2.25.

* * * * *